(12) United States Patent
Turock et al.

(10) Patent No.: US 12,688,536 B2
(45) Date of Patent: Jul. 21, 2026

(54) MONITORING MEDICAL DEVICES, AND SYSTEMS AND METHODS THEREFOR

(71) Applicant: Therap Services, LLC, Torrington, CT (US)

(72) Inventors: David Lawrence Turock, Fort Lauderdale, FL (US); Richard Allen Robbins, Lenox, MA (US); Md Asif Ali, Rocky Hill, CT (US); James Michael Kelly, Morris, CT (US); Md Rayed Bin Wahed, Dacca (BD); Khandker Mohammed Nurul Afsar, Narayangani (BD); Rimi Reza, Dacca (BD); Md. Shadman Sakib Chowdhury, Dacca (BD); M. Tanjid Hasan Tonmoy, Dacca (BD); Warren Stanton Gifford, Monroe Township, NJ (US)

(73) Assignee: Therap Services, LLC, Torrington, CT (US)

( * ) Notice: Subject to any disclaimer, the term of this patent is extended or adjusted under 35 U.S.C. 154(b) by 76 days.

(21) Appl. No.: 18/988,670

(22) Filed: Dec. 19, 2024

(65) Prior Publication Data

US 2025/0124520 A1      Apr. 17, 2025

Related U.S. Application Data

(63) Continuation of application No. 17/827,521, filed on May 27, 2022, now Pat. No. 12,217,316, which is a continuation-in-part of application No. 16/750,388, filed on Jan. 23, 2020, now Pat. No. 11,449,954, which is a continuation of application No. 15/197,120, filed on Jun. 29, 2016, now Pat. No.

10,586,290, which is a continuation-in-part of application No. 13/675,440, filed on Nov. 13, 2012,
(Continued)

(51) Int. Cl.
　　*G06Q 40/12*　　　(2023.01)
　　*G06Q 30/04*　　　(2012.01)
　　*H04L 9/40*　　　(2022.01)

(52) U.S. Cl.
　　CPC ............ *G06Q 40/12* (2013.12); *G06Q 30/04* (2013.01); *H04L 63/102* (2013.01); *H04L 63/104* (2013.01)

(58) Field of Classification Search
　　CPC ...... G06Q 40/12; G06Q 30/04; H04L 63/102; H04L 63/104
　　USPC .......................................................... 705/30
　　See application file for complete search history.

(56) References Cited

U.S. PATENT DOCUMENTS 9,888,337 B1 *　2/2018　Zalewski ........... G06Q 30/0635
9,894,471 B1 *　2/2018　Zalewski .............. H04W 76/10
(Continued)

*Primary Examiner* — Michael Tomaszewski
(74) *Attorney, Agent, or Firm* — James R. Klaiber; Klaiber IP Law LLC

(57) ABSTRACT

Disclosed are methods, systems, and devices for determining that medical devices, the networks to which they are connected, and other connected electrical devices are correctly powered, using normal power levels, able to communicate their results over various communications networks, and can notify people and/or systems of a failure of any of these conditions either in real time or on a deferred time basis. Communications to users regarding such failures are controlled using authorization rules, which may be HIPAA-compliant.

20 Claims, 16 Drawing Sheets

Related U.S. Application Data now abandoned, which is a continuation-in-part of application No. 13/600,388, filed on Aug. 31, 2012, now Pat. No. 8,615,790, and a continuation-in-part of application No. 13/600,040, filed on Aug. 31, 2012, now Pat. No. 8,613,054, said application No. 17/827,521 is a continuation-in-part of application No. 16/811,429, filed on Mar. 6, 2020, now Pat. No. 11,410,759, which is a continuation of application No. 15/636,826, filed on Jun. 29, 2017, now Pat. No. 10,622,103, which is a continuation-in-part of application No. 13/675,440, filed on Nov. 13, 2012, now abandoned.

(60) Provisional application No. 63/193,747, filed on May 27, 2021, provisional application No. 62/186,193, filed on Jun. 29, 2015.

(56) References Cited

U.S. PATENT DOCUMENTS

| | | | |
|---|---|---|---|
| 10,187,773 B1* | 1/2019 | Zalewski | H04W 76/10 |
| 2009/0150703 A1* | 6/2009 | Rave | G06F 3/0679 |
| | | | 713/340 |
| 2016/0173318 A1* | 6/2016 | Ha | H04W 4/02 |
| | | | 709/223 |
| 2016/0231721 A1* | 8/2016 | Lakshmanan | H01H 71/00 |
| 2016/0358722 A1* | 12/2016 | Lakshmanan | G05F 1/66 |
| 2018/0331548 A1* | 11/2018 | Hsu | H02J 7/933 |
| 2020/0213193 A1* | 7/2020 | Newell | H04W 4/70 |
| 2022/0301074 A1* | 9/2022 | Chowdhury | H04W 12/069 |

\* cited by examiner

Firmware Flowchart:

Server-Side

701

MONITORING MEDICAL DEVICES, AND SYSTEMS AND METHODS THEREFOR

CROSS-REFERENCE TO RELATED APPLICATIONS

This application claims priority to U.S. Provisional Patent Application No. 63/193,747 filed May 27, 2021, the disclosures and teachings of which are incorporated herein by reference in their entirety.

This application is also a continuation of pending U.S. patent application Ser. No. 17/827,521 filed May 27, 2022, which is a continuation-in-part of U.S. Pat. No. 11,449,954 filed as application Ser. No. 16/750,388 on Jan. 23, 2020 and issued Sep. 20, 2022, which is a continuation of U.S. Pat. No. 10,586,290 filed as application Ser. No. 15/197,120 on Jun. 29, 2016 and issued Mar. 10, 2020, which claims benefit of U.S. Provisional Application No. 62/186,193, filed Jun. 29, 2015, and is a continuation-in-part of U.S. patent application Ser. No. 13/675,440 filed Nov. 13, 2012,which is a continuation-in-part of U.S. Pat. No. 8,615,790 filed as U.S. Patent application Ser. No. 13/600,388 on Aug. 31, 2012 and issued Dec. 24, 2013, which is a continuation-in-part of U.S. Pat. No. 8,613,054 filed as U.S. patent application Ser. No. 13/600,402 on Aug. 31, 2012 and issued Dec. 17, 2013, which is a division of U.S. Pat. No. 8,281,370 filed as U.S. patent application Ser. No. 11/604,577 on Nov. 27, 2006 and issued Oct. 2, 2012, the disclosures and teachings of each of which are incorporated herein by reference in their entirety.

This application is also a continuation-in-part of pending U.S. patent application Ser. No. 16/811,429, which is a continuation of U.S. Pat. No. 10,622,103 filed as application Ser. No. 15/636,826 on Jun. 29, 2017 and issued Apr. 14, 2020, which is a continuation-in-part of U.S. patent application Ser. No. 13/675,440 described above, the disclosures and teachings of each of which are incorporated herein by reference.

BACKGROUND OF THE DISCLOSURE

Plug-in outlets and power strips that plug into in-wall electrical outlets have long been used to increase the number of available electrical outlets, to provide protection from electrical overload due to power surges, or to make available short-term battery backups due to power failures. With the advent of so-called "smart plugs," new internet-connected plug-in outlets and power strips can measure the amount of power being drawn from appliances that are connected to them, report on power usage, and/or perform limited functions that can be set by the user. Such functions can include turning on or off the power to an appliance at a pre-set time, or under certain conditions (for example, power can be turned off to an appliance when the smart plug senses that the appliance goes into low-power mode). The smart plug is plugged into a power outlet, and appliances or other devices are plugged into the smart plug. Control and monitoring of the power to the appliance or device occurs through the plug, thus transforming the appliance into a "smart device" which can be controlled or monitored from a distance. Smart plugs can connect with "smart home" control systems, and can be controlled by the user via a smart phone or other online connection.

Many people have a variety of ongoing care and support needs for health and independence. An increasing number of Internet connected devices are becoming available to monitor health and other conditions to both report status and collect data for analysis. For example, a sleep mat can alert when a person gets into or out of bed, and can collect data to analyze the quality of sleep. Some devices notify of incontinence events. Other devices measure heart rate and blood oxygen. Smart watches can monitor an increasing array of activities and conditions. In addition to these monitoring devices, other devices, such as pacemakers, can provide life-critical functions and can report status and problems, for example directly through local Wi-Fi, or by linking indirectly to the Internet through other smart devices. Internet devices can interact in an open-loop or closed-loop system. An open-loop control system (also known as a non-feedback system) acts completely on the basis of input; the output has no effect on the control action. A closed-loop control system looks at the current output and alters it to the desired condition; also known as a feedback system, the control action in these systems is based on the output.

IoT ("Internet of Things") refers to a network of devices and other physical objects that can be embedded with sensors, software, and other technologies for the purpose of connecting and exchanging data with other devices and systems over the Internet. An IoT ecosystem incorporates web-enabled smart devices that use embedded systems, such as processors, sensors and communication hardware, to collect, send and act on data they acquire from their environments. IoT devices share the sensor data they collect by connecting to an IoT gateway or other edge device where data is either sent to the cloud to be analyzed or analyzed locally. Sometimes, these devices communicate with other related devices and act on the information they get from one another. The devices do most of the work without human intervention, although people can interact with the devices-for instance, to set them up, give them instructions or access the data. These devices require power from an electrical outlet or a battery. In order to connect with a system or other device, a device in an IoT environment requires a connection to the Internet, a server, or cell service, in order to function and communicate. But what happens if the cord into the electrical outlet is pulled? What happens if the electrical power fails? What happens if the local Wi-Fi or server system fails? What happens if the Internet or cell tower goes out? Current devices have insufficient fail-safe mechanisms and lack an end-to-end mix of connectivity and awareness of what is still working.

Existing IoT or "smart" devices in the medical field have significant shortcomings. Even devices that rely on their own battery power, such as smart watches and pacemakers, depend on the local Wi-Fi and Internet or Cellular connection for communications. If these devices are providing critical life support, real-time notification is essential. Even if the support and monitoring provided by the devices are not immediately life-threatening if cut off, people still need to know, with varying levels of urgency, that alerts and signals from those devices are not being sent and data are not being collected for analysis. Even relatively simple devices, such as refrigerators, may be maintaining medications and food at critical temperatures, and air conditioners may be essential for health and comfort. To compound this problem, many existing alarm systems rely on just one communications mode.

Cyber security is also a major challenge for IoT devices. Deploying devices that may be in service for many years without modification makes them open to the continuing advance of threat technologies. The wide range of communications needs for smart plugs means they need flexible communications systems. Because smart plugs have limited computing resources, they are restricted in the security measures they can employ.

BRIEF SUMMARY OF THE DISCLOSURE

Described is an improved method, system, and IoT device for continuously monitoring that medical and other devices are plugged into power, are using normal power levels, and are able to communicate their results over various communications networks. In some embodiments, the improved method, system, and device can notify people and systems of a failure of any of these conditions, in real time. Also described herein is an improved method, system, and IoT incontinence monitoring device for detecting incontinence and continuously monitoring that the incontinence monitoring device is operational. The improved incontinence monitoring method, system, and device can notify people and systems of a problem in the operational status of the detection system.

This application is directed to solutions to problems specifically arising in the realm of computer networks and to specific improvements in computer network functionality that address these problems. The invention improves the acquisition and transmission of information, including protected health information, across multiple networks and security domains. IoT systems and devices that perform the functions at least of reporting that medical or other machines and devices have power, while also reporting on the power and communication ability of the IoT device itself, were neither routine, well-understood, nor conventional in the field of health information technology, as that term is defined in the HITECH (Health Information Technology for Economic and Clinical Health) Act.

For improved monitoring of medical machines and other devices, the device to be monitored is plugged into an "IoT device" or IoT device of the invention. The IoT device detects that the monitored device is plugged in and has a normal power consumption. The IoT device exchanges a frequent, periodic stream of messages, for example every 1, 2, 3, 4, 5, 6, 8, 10, or 15 seconds, with a Monitoring System using the same communications network or networks as the monitored device. These messages act as a "dead-man switch" so that any failure of a message to arrive is immediately detected by the Monitoring System. These messages can also convey any change in status of the monitored device or of the communications networks, and synchronize the status. The IoT device can function on a two way signal. If the IoT device is not getting a notice back from a "home base" then it might take some action by itself. If the IoT device determines that the home base cannot connect back to it, it could notify, e.g., staff in the hallway to check on the person. The IoT device may use several different communications networks to improve its ability to communicate with a Monitoring System. The IoT device may have an internal power source so it can send messages in case of a power failure to its power outlet.

Devices that detect incontinence can alert caregivers to episodes of incontinence in patients needing assistance, which helps with patient health and comfort. However, prior art incontinence monitoring devices and systems have several problems. Present incontinence systems trigger a loud alarm in the proximity of the transducer that detects moisture when incontinence is detected. The loud sound from the alarm creates a disturbance for other individuals living in the same facility. Also, if any part of the prior art incontinence monitoring system is disabled, the system fails to alert caregivers to either the system malfunction, or an incontinence event. In contrast, the disclosed incontinence monitoring device (IMD) can monitor and send a signal over the internet/network that can alert caregivers that are not physically present in the room where the incontinence is being monitored, and thus can notify concerns without causing disruption nearby. The IMD of the invention both checks for incontinence, and checks that the system is working properly, on a feedback loop. The IMD of the invention is present in the room with a patient, and is connected in a secure way outside of the room. The device has a plug for the moisture-sensing mat. If the mat detects moisture, it closes a relay device, which sends a message across the network. The device checks on a repeat loop for moisture detection. If the device doesn't get a check in from the mat, it notifies that the channel is not responding.

The IoT device and the IMD are designed to have multiple redundancies in monitoring, to ensure that the devices are operational and connected to systems. Thus, for example, for an appliance or medical device connected to an IoT device of the invention, the IoT device is monitoring power use and communicating that the appliance or medical device is functioning normally, but the system is also monitoring that the IoT device is communicating normally, and additional processes are further monitoring that the system connection to the IoT device is functional and communicating; these additional processes can themselves be monitored to ensure connectivity, and so on. The IMD is similarly designed with multiple layers of redundant monitoring.

For both the IoT device and the IMD, if normal conditions are not met for any reason, or if particular conditions occur, the system can notify people and other systems that there is a change, and the nature of the change. The Notification System offers a flexible set of methods to alert people and other systems using, for example, text messaging, email, pager, voice telephone, and direct computer interfaces, to assure that notifications are received. The notifications can also depend on such factors as the urgency of being notified, for example the user may not want to be notified of an electrical power outage of less than a minute.

Access to Personal Health Information ("PHI") about health and related conditions is strictly regulated by the Health Insurance Portability and Accountability Act of 1996 ("HIPAA"), the American Recovery and Reinvestment Act of 2009 ("ARRA"), and the Health Information Technology for Economic and Clinical Health Act ("HITECH") and other state and federal regulations which complicates providing support and services including analyzing and reviewing documentation (collectively, "HIPAA-type regulations").

Because the devices being monitored may involve the collection and/or use of health data, the fact that a device is not functioning as expected may be PHI subject to protection under HIPAA-type regulations. Therefore, the Notification System can include secure communications protocols that satisfy HIPAA-type regulations where notifications are sent to users through the system based on roles and caseloads as described in U.S. Pat. No. 8,281,370. As shown by reference 911 in U.S. Pat. No. 8,281,370, data may be stored in the system's storage array. Access to information is based on caseload(s) and defined access roles (See FIG. 27). The documentation can include the information on caseloads, tracking, storage, and tagging as discussed in U.S. Pat. No. 8,281,370, including but not limited to the discussion Col. 5, line 21-col. 7, line 32. As discussed in U.S. Pat. No. 8,281,370, caseloads are the specific set of information that defines what individual or program a user can have access to. Super roles are referred as the privilege that a user needs in order to access a particular application within the system. The documentation can include the information on caseloads and super roles, discussed in U.S. Pat. No. 8,281,370, including but not limited to the discussion Col. 4, line 64-col. 5, line 60, and Col. 12, line 62-Col. 15, line 3. There may be other types of protected health information that is not subject to HIPAA-type regulations.

The Notification System uses a variety of different communications mechanisms so that even if there is a widespread power failure or Internet failure, such as with major storms, the notifications have many options to get through. The people or systems contacted will acknowledge that they have received a notification so the Notification System can decide when it has completed the notification goal. Notifications can include sound, lighting, dings, etc.

The Monitoring System can be a physical system, a cloud-based computing system, or applications running on smart devices or computers. This also enables direct monitoring by users, or as components of the overall Monitoring System.

DETAILED DESCRIPTION OF THE DISCLOSURE

The disclosed inventions are directed to solutions to problems specifically arising in the realm of computer networks and to specific improvements in computer network functionality that address these problems. IoT systems and devices that perform the functions at least of monitoring and reporting that medical or other machines and devices have power, while also reporting on the power and communication ability of the monitoring IoT device itself, are neither routine, well-understood, nor conventional in the field of health information technology, as that term is defined in the HITECH Act.

This disclosure describes methods, systems, and devices for determining that lifesaving and life monitoring devices are plugged into power, are using normal power levels, are able to communicate their results over various communications networks, and can immediately notify people and systems of a failure of any of these conditions.

The inventors identified the problem of the difficulty of detecting power loss to medical monitoring and healthcare devices, particularly in situations where the user is not near the medical equipment and cannot see or hear the machine stop working. The inventors designed an IoT device that could monitor power loss and the status of medical devices and report its findings. The IoT device is an intermediary between a medical device and its power source. The IoT device is plugged into a power source or power connector, and the medical device is plugged into the IoT device, such as by a USB or other electrical connection. The IoT device is connected to a network, by hardwiring or a remote connection such as by Bluetooth connection to a local Wi-fi network. The IoT device monitors current flowing from the power source to the appliance or medical device and determines whether the appliance or medical device is drawing power. The IoT device can then provide regular updates of the status of the device being monitored. The IoT device can have a signal that it is initially functioning, such as a light that (a) turns red when the IoT device is connected to power and (b) turns green when the IoT device is connected to Wi-fi. Monitoring performed by the IoT device is monitored through the system, for example by an internet web application. If a failure happens or Wi-fi connection is lost, the IoT device will stop sending messages, and after a predetermined length of time, if no messages are received by the system, the system will provide an alert that the IoT device communications have been disrupted.

Figure 1:
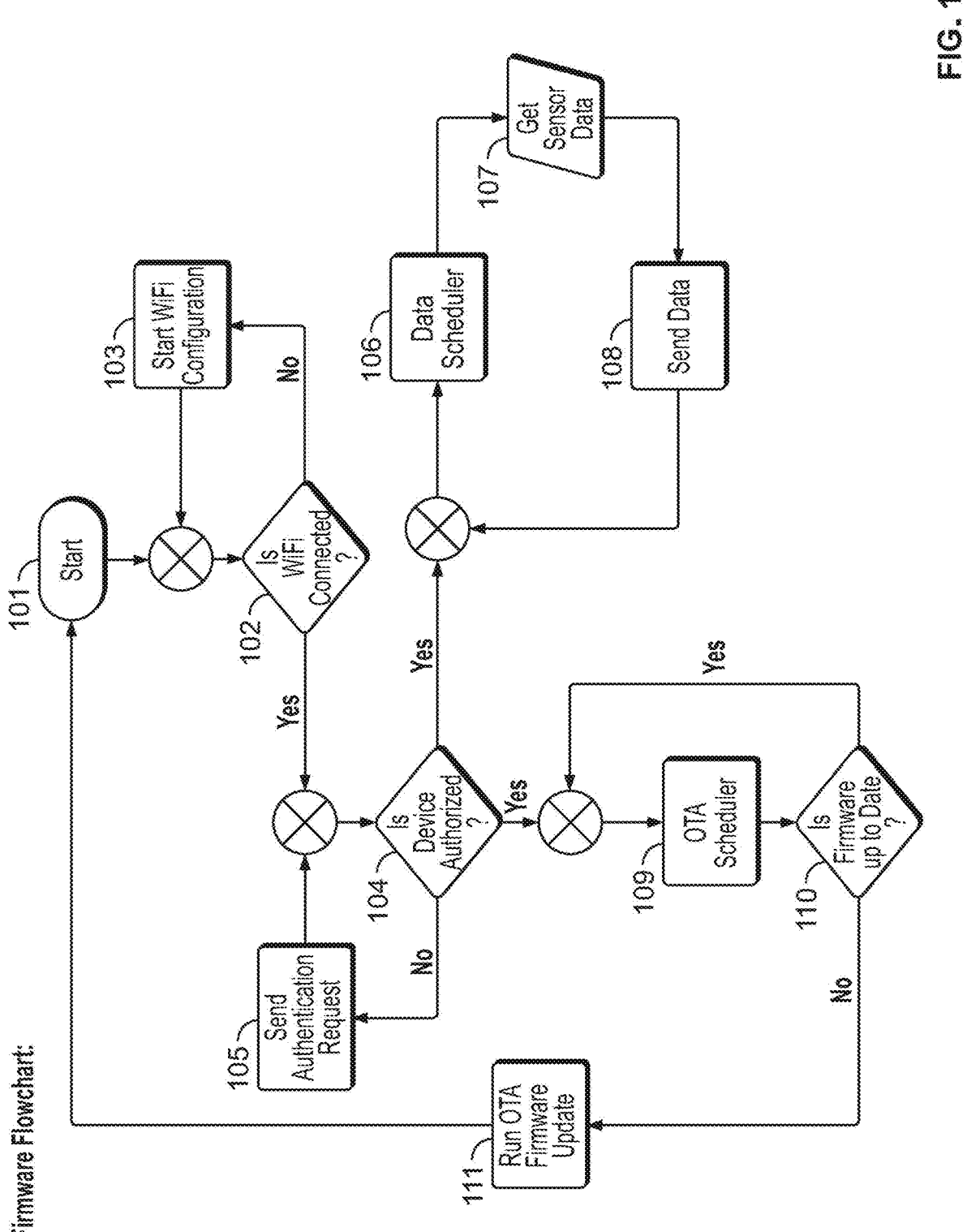
FIG. 1 is an illustration of how the disclosed IoT device and incontinence devices operate.

FIG. 1 is a general schematic for how the claimed devices communicate within the system. For the example of an IoT device, the IoT device is plugged into an electrical outlet and the device to be monitored is plugged into the IoT device, after which operation starts (101). In this embodiment, the IoT device first confirms it is connected to a communications network, such as Wi-Fi (102), and if not, configures the Wi-Fi (103). Once the IoT device has confirmed the communications connection, it next confirms that the device connected to it is an authorized device, that is, a device that is provisioned or allocated to a patient or individual (104), and if not, requests authorization (105). The network connection and device authorization can be initiated, for example, by a smart phone or other network-connected device that can also connect to the IoT device. The IoT device then proceeds to perform the functions of data scheduling (106) and periodically collecting (107) and sending (108) data from sensors connected to the IoT device and periodically confirming (110) that the firmware is up to date according to the OTA Scheduler (109). OTA is the Over the Air system that allows the firmware in the IoT device hardware to add functionality, fix bugs in protocol, make the system more efficient, and generally provide updates and/or improvements to the IoT device. The server side sends a message with the new programming instruction (111) and, upon receipt of the instruction, the IoT device restarts using the new software (101).

The IoT device and the incontinence monitoring device (IMD) according to the invention are designed to have multiple redundancies in monitoring, to ensure that the devices are operational and connected to systems. Thus, for example, for an appliance or medical device connected to an IoT device of the invention, the IoT device is monitoring power use and communicating that the appliance or medical device is functioning normally. In addition, the system is monitoring that the IoT device is communicating normally, and additional processes are further monitoring that the system connection to the IoT device is functional and communicating; these additional processes can themselves be monitored to ensure connectivity, and so on. The IMD is similarly designed with multiple layers of redundant monitoring. The IoT device and IMD can be integrated into a redundancy server that routinely checks that the devices/ systems on the server are functioning. This redundancy server can itself be monitored by a second copy of the redundancy server which can, in turn, be monitored by a third server. This recursive redundancy can be carried out to as many levels as desired, depending on the needs of the application. For example, a system monitoring a critical care cardiac patient's heart rhythm on a beat-by-beat basis could have multiple levels of redundancy configured since even a brief breakdown in the measurement system could be a life-or-death matter.

In an IoT device according to the invention, the device to be monitored is plugged into the IoT device which is itself plugged into a power source. The IoT device detects that the monitored device is plugged in and has a normal power consumption, by sensing current use as the monitored device draws power. The IoT device is connected to a Wi-Fi or other network. The IoT device exchanges a frequent, periodic stream of messages, for example every 5 seconds, with a Monitoring System using the same communications network or networks as the monitored device. These messages act as a "dead-man switch" so that any failure of a message to arrive is immediately detected by the Monitoring System. These messages can also convey any change in status of the monitored device or of the communications networks, and synchronize the status. The IoT device may use several different communications networks to improve its ability to communicate with a Monitoring System. The IoT device may have an internal power source so it can send messages in case of a power failure to its power outlet.

Figure 2:
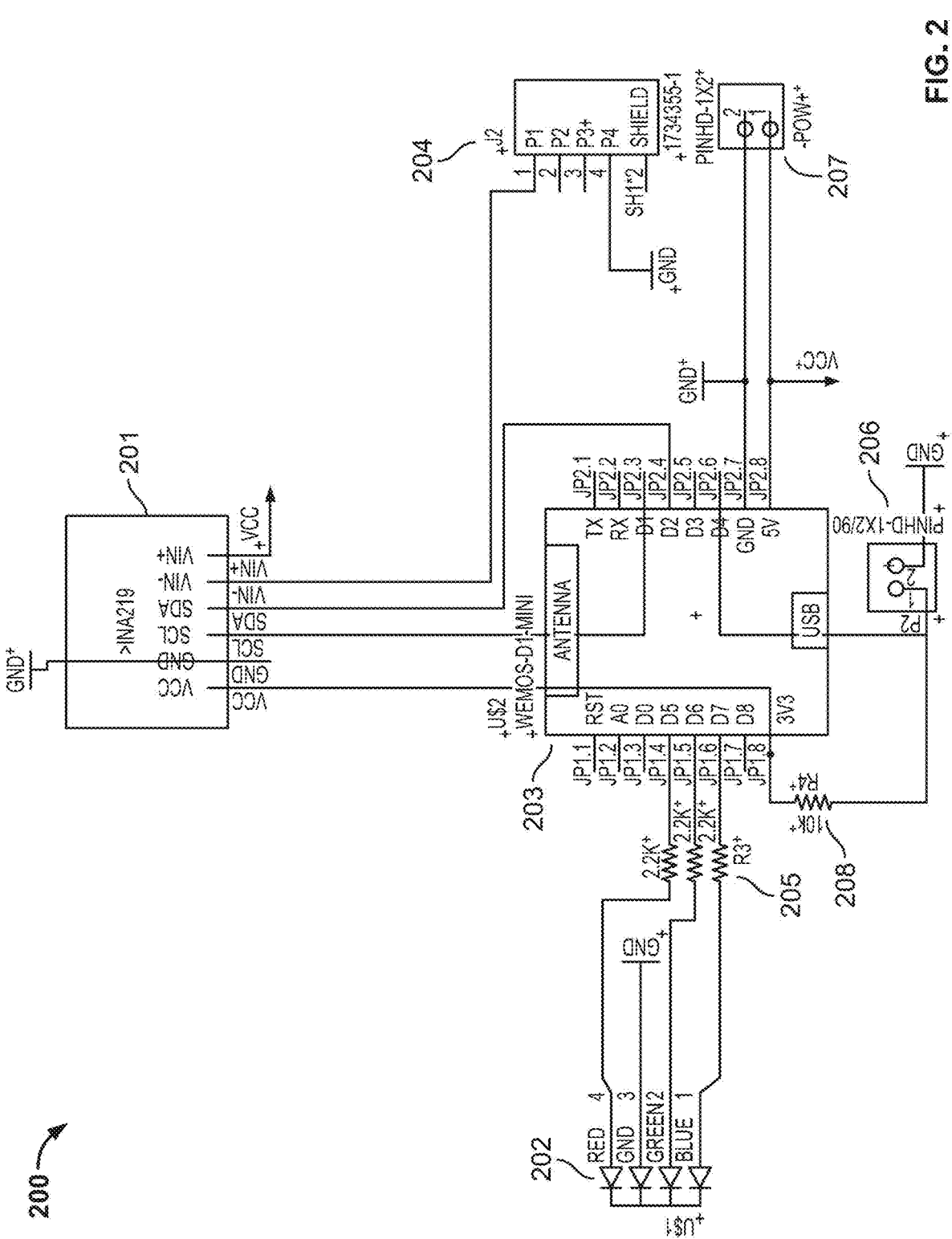
FIG. 2 is a schematic of an exemplary IoT device showing the interconnection of electric and electronic components.

As depicted in FIG. 2, in an IoT device of the invention (200), the main hardware components of an exemplary smart USB device and its primary components include: (1) a Wi-Fi enabled microcontroller with antenna; (2) a sensor for current flow (3) a USB connector; (4) an LED indicator light; and (5) one or more resistors. FIG. 2 is a schematic of the operational design and interconnection of electric and electronic components in an IoT device. In FIG. 2, main processing unit of the Smart plug device (203) has a built-in Wi-Fi chip and antenna. The INA 219 current sensing module (201) is used to measure the current flow to the device connected to the IoT device's output terminal (204). Module (201) communicates with the microcontroller (203) using I2C protocol. The SCL and SDA pins of module (201) are connected directly to the MCU unit's D1 and D2 pin respectively, and is powered by the microcontroller unit's 3.3 v terminal. One USB A female type connector (204) is used to provide power to the device that needs to be monitored. A USB A female type connector is used so that any device that gets powered through a USB A male type connector can be connected to this IoT device. A USB A male type connector (207) is used with an extended wire to power the IoT device. Both the IoT device and the device that is monitored will get power through this connector. A RGB LED indicator light (202) is connected to 3 digital output pins of the MCU via 3, 2.2k resistors (205). The RGB LED indicates different modes of the IoT device. One tactile push button (206) is used to open the Wi-Fi configuration portal or to factory reset on demand. A 10k resistor (208) is used to construct a pullup switch at the MCU's digital pin 4.

Figure 3:
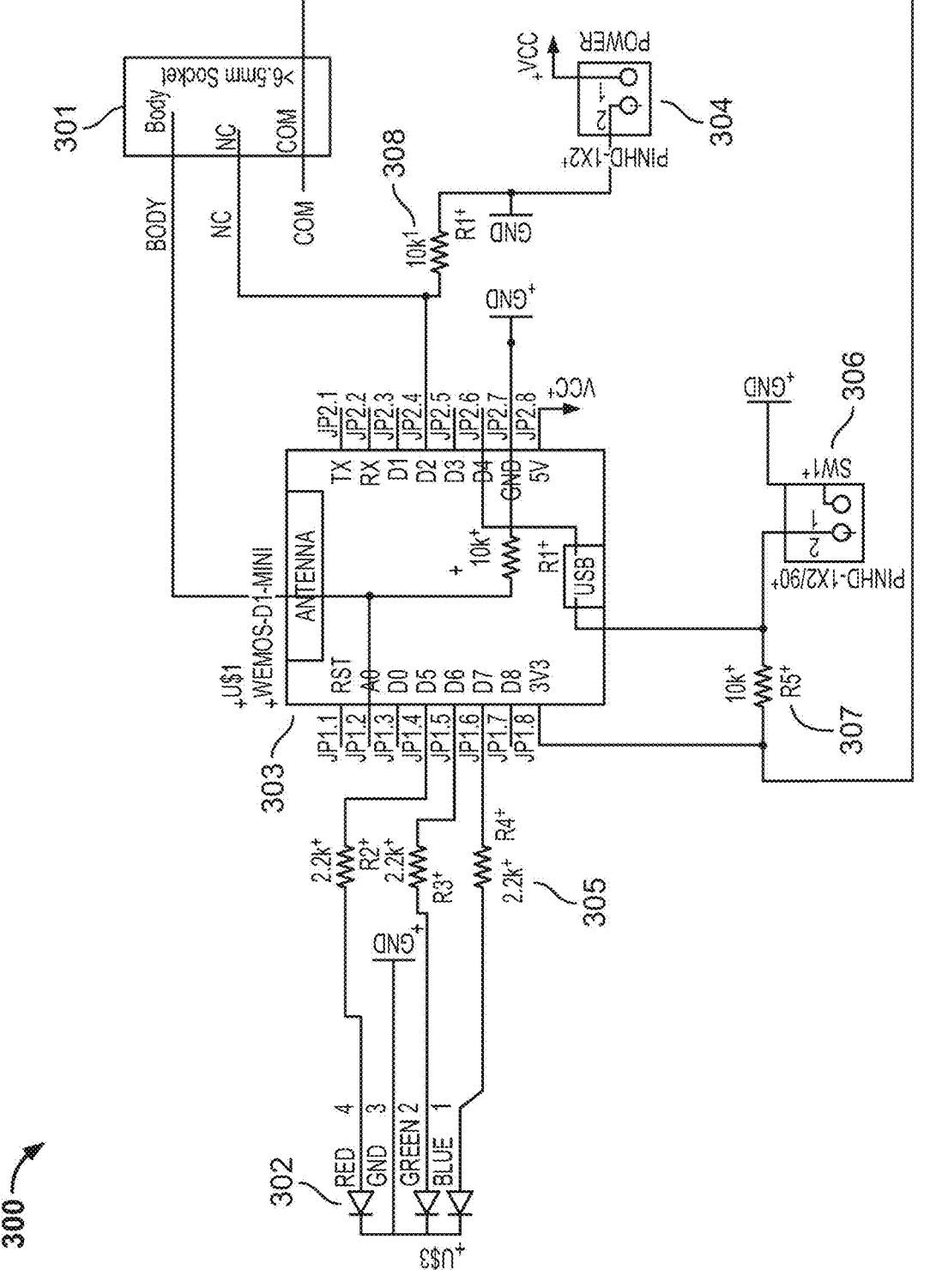
FIG. 3 is a schematic of an exemplary incontinence monitoring device showing the interconnection of electric and electronic components.

Also disclosed is an improved device for detecting incontinence. As depicted in FIG. 3, in an incontinence monitoring device (IMD) according to the invention (300), the main hardware components of the inventive IMD may include: (1) a Wi-Fi enabled microcontroller; (2) a bed mat to sense incontinence events (; (3) a stereo jack socket; (4) an LED indicator light; and (5) one or more resistors. FIG. 3 is a schematic of the operational design and interconnection of electric and electronic components in an IMD. The main processing unit (303) of the Smart plug device has a built-in Wi-Fi chip and antenna. A bed mat connector, for example a Stereo jack socket (301) is used to plug the incontinence detection mat. This socket (301) shorts 2 of its terminals (NC and COM) and acts as a switch when the mat is connected. The COM terminal of is connected to the 3.3v pin of the MCU unit, and the NC terminal is pulled down to GND with a 10k Ohm resistor (308) and connected to a digital pin of the MCU at the same time. The connection state is detected with the MCU units digital pin 2. The terminal named BODY is connected to an analog pin (A0) of the MCU unit and pulled down to GND to avoid noise. From the analog pin, incontinence is detected by measuring the continuity between the BODY and COM terminal. A RGB LED indicator light (302) is connected to 3 digital output pins of the MCU via three 2.2k resistors (305), and is used to indicate different modes of the IoT device. One tactile push button (306) is used to open the configuration portal or factory reset on demand. A 10k resistor (307) is used to construct a pullup switch at the MCU's digital pin 4. A USB male type connector (304) is used with an extended wire to power the IoT device.

Figure 4:
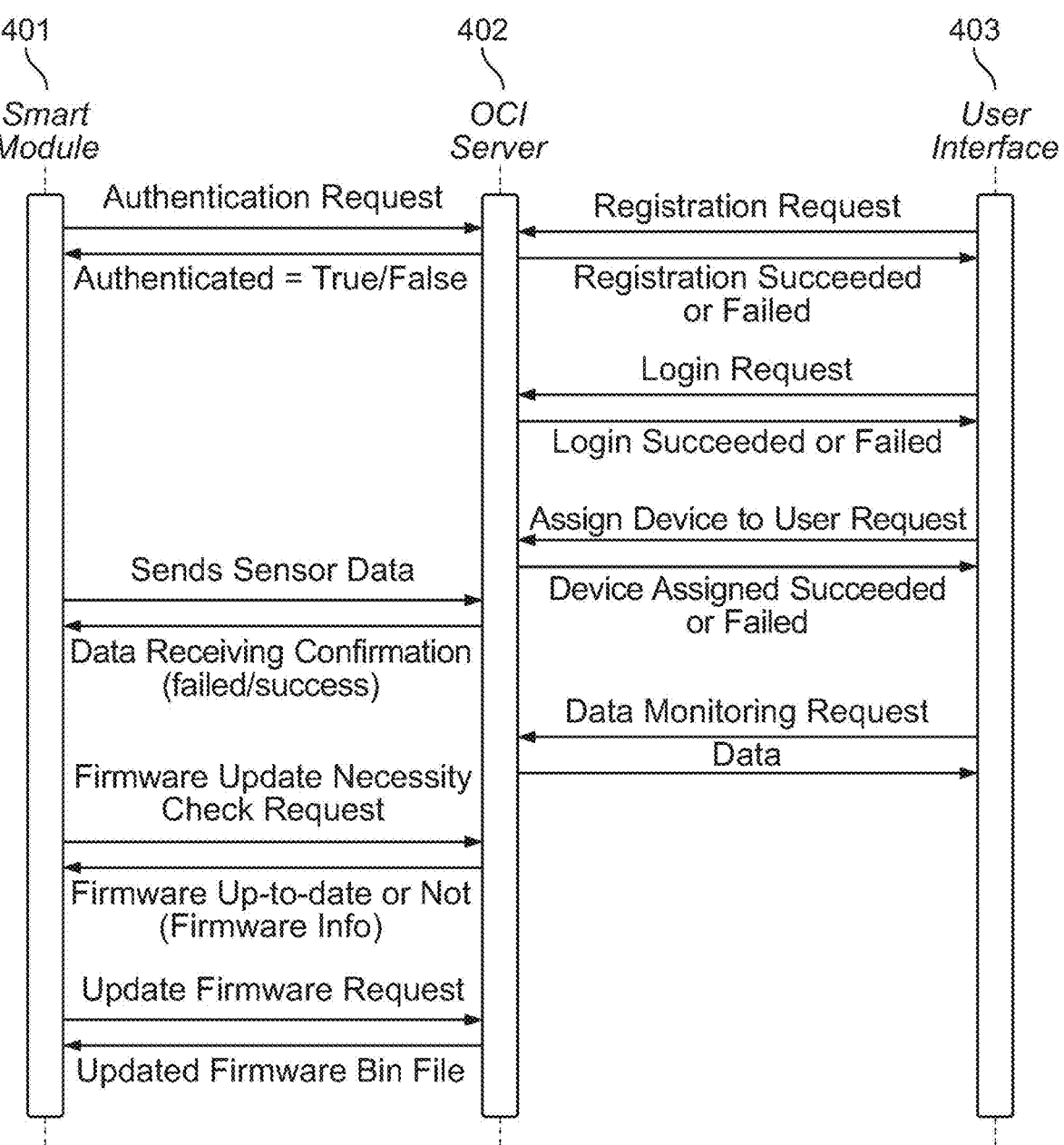
FIG. 4 is a diagram of exemplary interactions between the IoT device or IMD, the server, and the user interface.

FIG. 4 outlines exemplary interactions between the IoT device (200) or IMD (300) (smart module 401), the server (402), and the user interface (403). The IoT device ("smart module") is connected to a cloud server, for example, a cloud server by Oracle (OCI), Microsoft, Google, Amazon, IBM, or other cloud servers. The user interface, such as a computer or smartphone application, also connects to the cloud server and thus the server connects the IoT device and the user. The IoT device sends an authentication request to the server, which accepts or denies the request. If the authentication request is denied, the IoT device is not allowed further access to the system. If the IoT device is authenticated, the IoT device is then connected to the system. The IoT device sends sensor data to the server, which confirms receipt of the data or provides an alert when data is not received. The IoT device periodically sends a firmware update necessity check request to the server, which checks whether the IoT firmware is up-to-date and signals whether the device needs to request a firmware update. If the IoT device needs an update, the IoT device will make the request to the server.

FIG. 4 further shows how a user connects to the system. First, the user sends a registration request to the server, which request is accepted or denied. If the registration fails, the user interface is denied access to the server. If the user interface registration request is successful, the user then can log into the system. If the login is successful, the user can then seek to have a device assigned to the user. If the assignment is successful, the user is in communication with the IoT device. The user or user interface can send requests for data from the system or the IoT device, and can receive data and other desired notifications accordingly.

Both the IoT device and IMD disclosed herein are equipped with a Notification System. If normal conditions are not met for any reason, the system can notify people and other systems that there is a change, and the nature of the change. The Notification System offers a flexible set of methods to alert people and other systems using, for example, text messaging, email, pager, voice telephone, and direct computer interfaces, to assure that notifications are received. The notifications can also depend on such factors as the urgency of being notified, for example the user may not want to be notified of an electrical power outage of less than a minute.

Because the devices being monitored may involve health data, the fact that a device is not functioning as expected may be Protected Health Information. Therefore, the Notification System can include HIPAA secure communications protocols where notifications are sent to users through the system based on roles and caseloads as described in U.S. Pat. No. 8,281,370, the disclosure of which is incorporated by reference in its entirety.

The Notification System uses a variety of different communications mechanisms so that even if there is a widespread power failure or Internet failure, such as with major storms, the notifications have many options to get through. The people or systems contacted will acknowledge that they have received a notification so the Notification System can decide when it has completed the notification goal.

Figure 5:
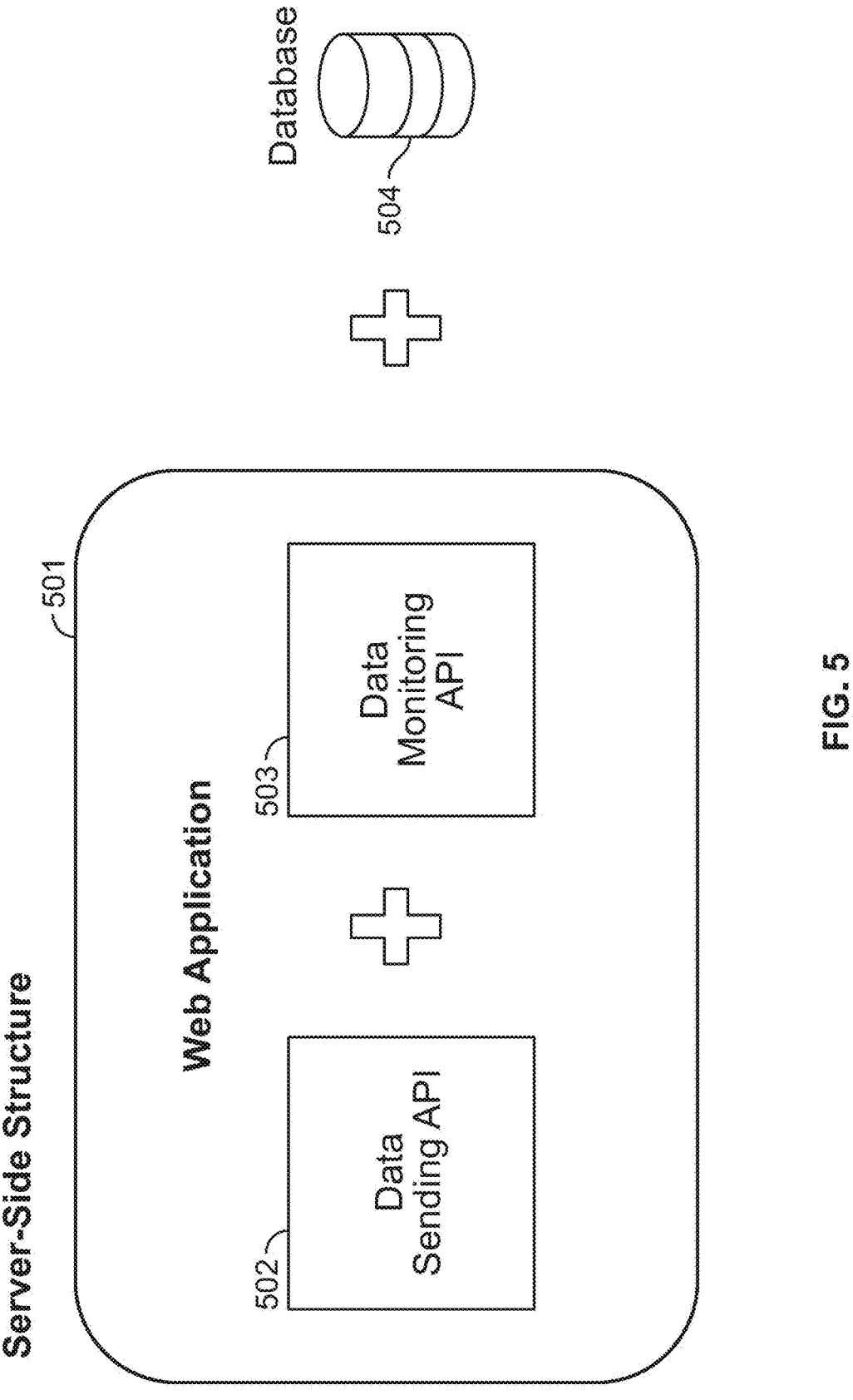
FIG. 5 is a diagram of the server-side structure.
Figure 6:
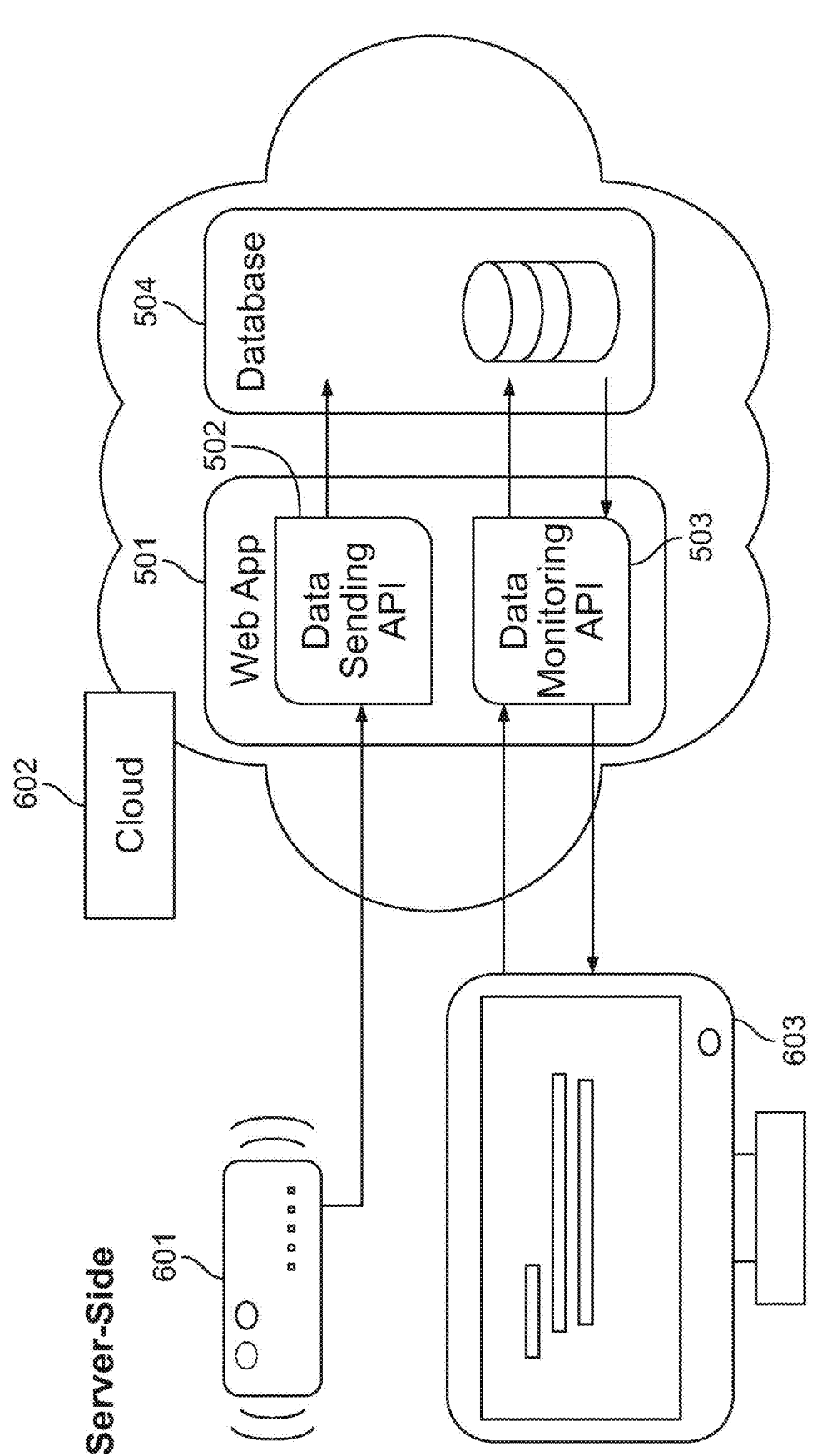
FIG. 6 is a diagram of a cloud-based server-side structure.

FIGS. 5-6 illustrate an exemplary server-side structure that includes a web application (501) encompassing an application programming interface for sending data (502) and an application programming interface for monitoring the data being sent (503), alongside a database for storage and retrieval of the data (504). The IoT device (200) and the Incontinence monitoring devices (300) can be used to monitor status; in addition, the disclosed devices (601) are also monitored and displayed by the system (603), as the system is measuring the health and functioning of the device, and the cloud (602) is monitoring the IoT device for states. If an IoT device or IMD is disconnected, the cloud system does not get feedback from the device and notifies users of lack of feedback/system error.

Figure 7:
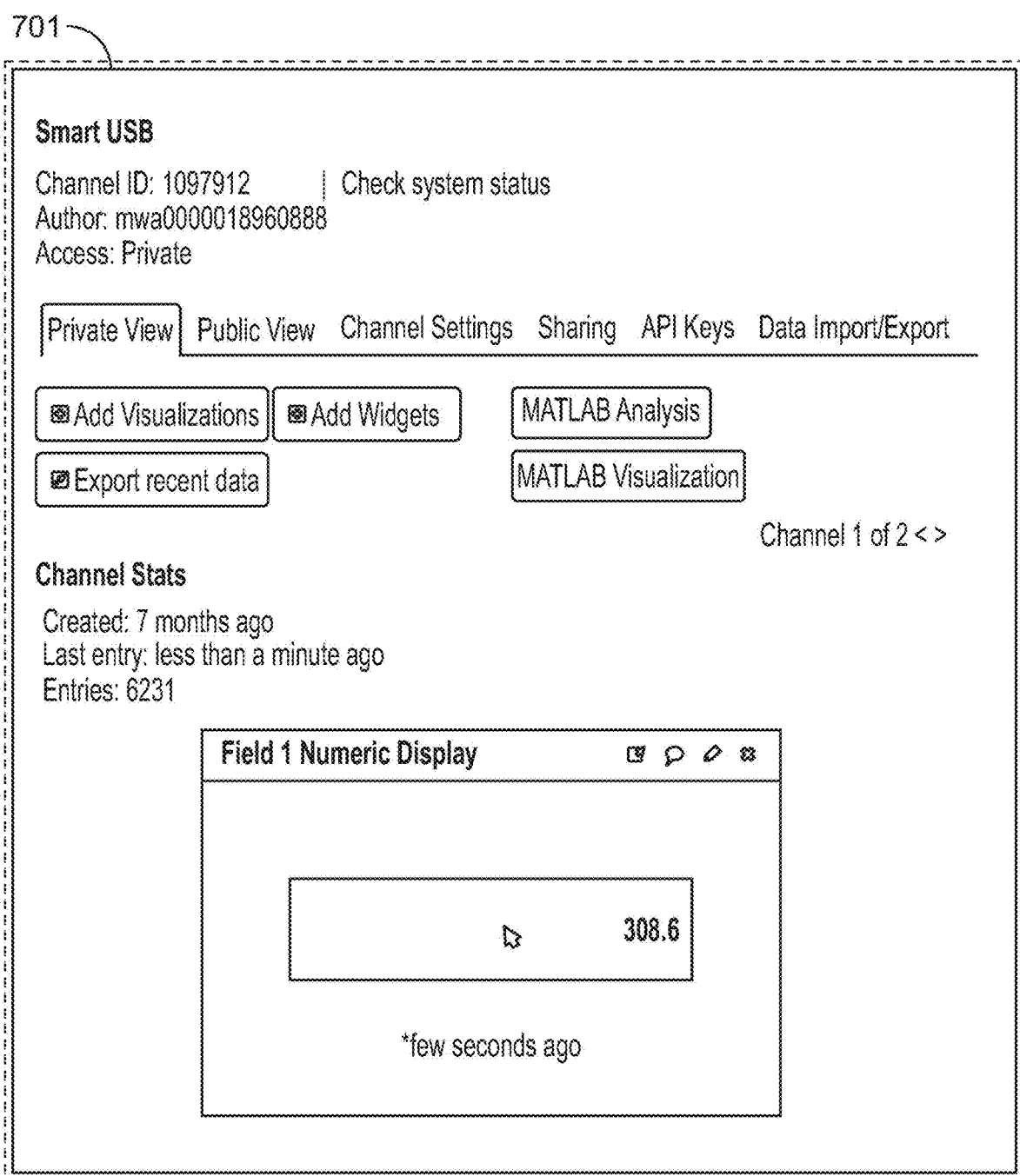
FIG. 7 is a screenshot showing an IoT device communication to the monitoring system identifying power usage by the machine being monitored by the IoT device.

FIG. 7 is a screenshot (701) showing an IoT device communication with the monitoring system with a display. The monitoring system includes an application that connects to the IoT device and shows that the device (here, a "smart USB") is operational. The Monitoring System can be a physical system, a cloud-based computing system, or applications running on smart devices or computers. This also enables direct monitoring by users, or as components of the overall Monitoring System. Even devices that rely on their own battery power, such as smart watches and pacemakers, depend on the local Wi-Fi and Internet or Cellular Internet for communications. Having the IoT device monitor those communications systems is necessary to know that those devices can perform their functions by communicating. If these devices are providing critical life support, immediate notification is essential. Even if the support and monitoring provided by the devices are not immediately life-threatening, people still need to know, with varying levels of urgency, that alerts and signals from those devices are not being sent and data are not being collected for analysis. Even relatively simple devices, such as refrigerators may be maintaining medications and food at critical temperatures, and air conditioners may be essential for health and comfort. Many existing alarm systems rely on just one communications mode, so the IoT device using many different modes is an added advantage on top of them.

Figure 8:
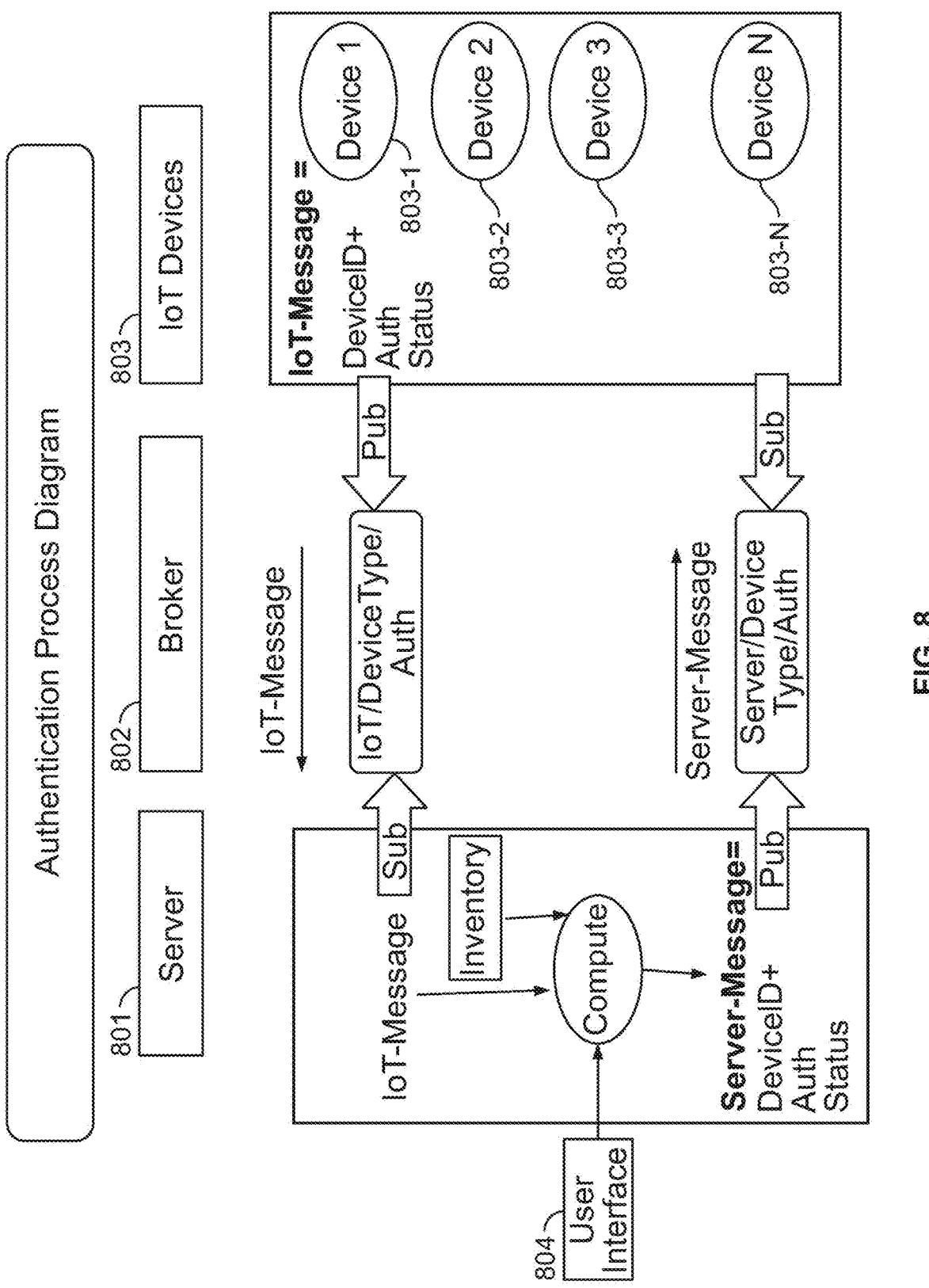
FIG. 8 is a diagram of an embodiment of a Device Authorization and User Assignment Architecture.
Figure 9:
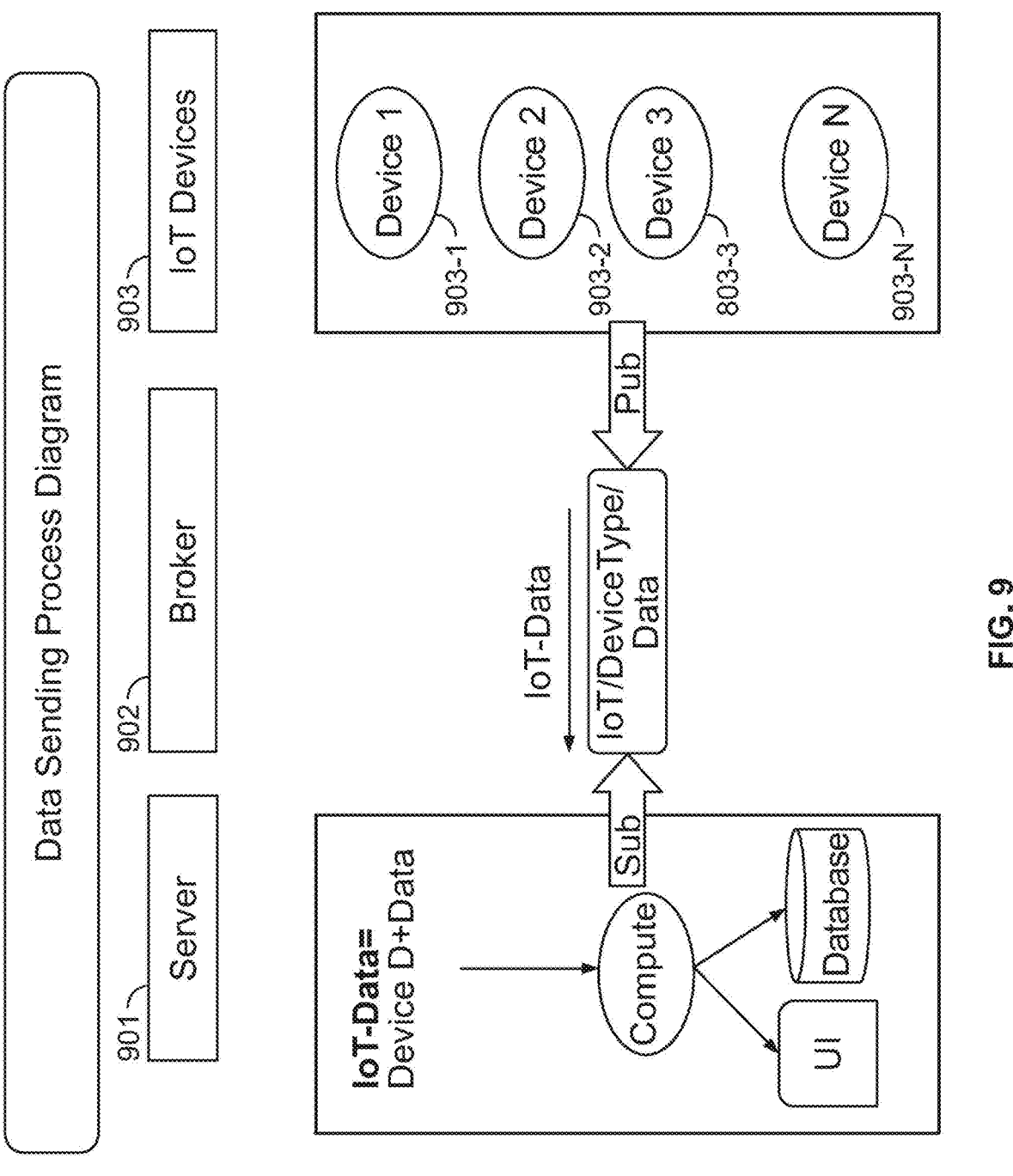
FIG. 9 is a diagram of an embodiment of a Data Sending Architecture.
Figure 10:
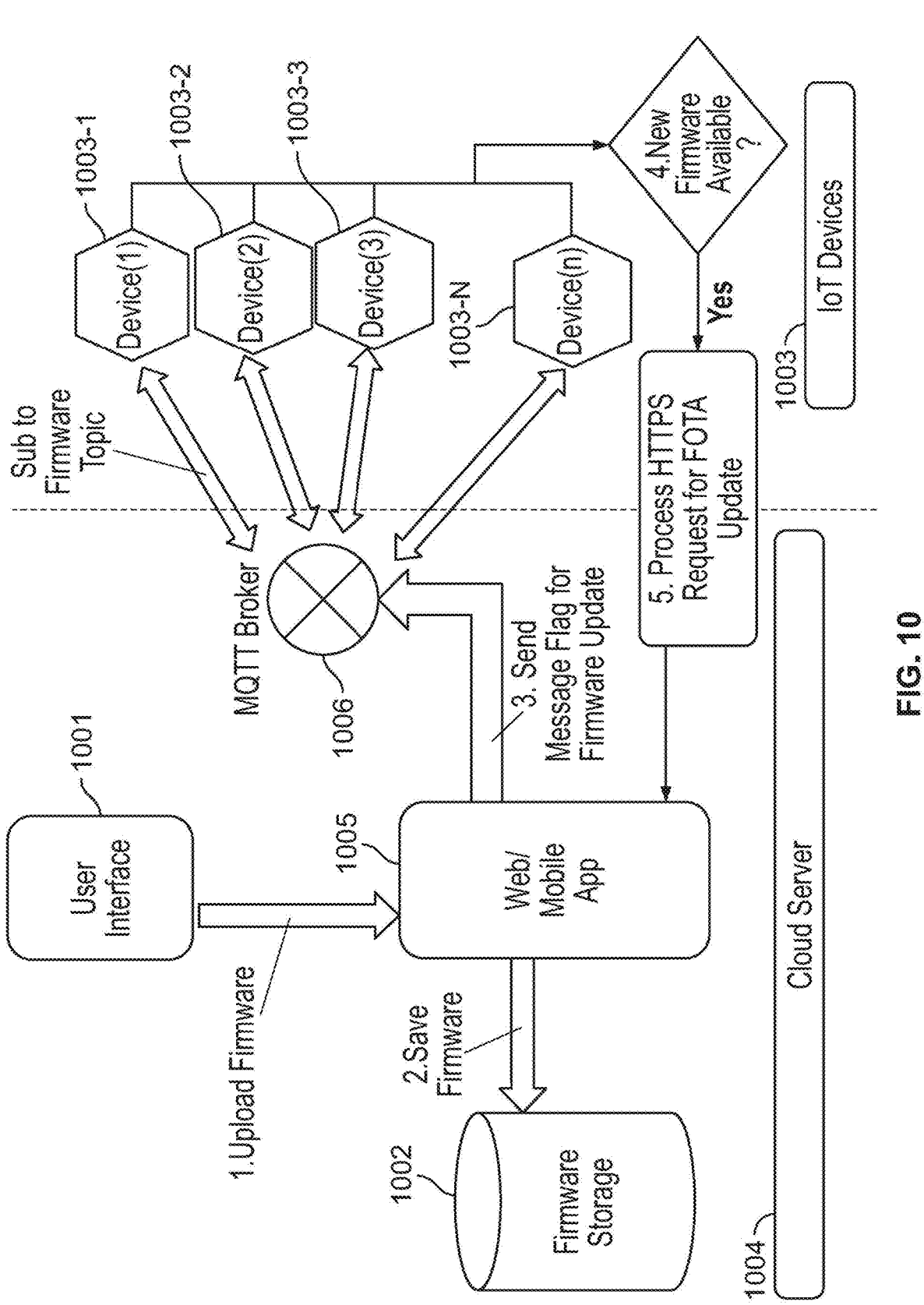
FIG. 10 is a diagram of an embodiment of a Firmware Update Architecture.

FIGS. 8-10 illustrate an embodiment of a Device Firmware to Server Communication Architecture.

FIG. 8 illustrates an embodiment of a Device Authorization and User Assignment Architecture. Every IoT Device (803-1, 803-2, 803-3, . . . 803-N) publishes an IoT Message (a unique message consisting of Device ID and some other information if needed, e.g. Device ID+Auth Status) to an authentication topic (e.g. IoT/SP/Auth) in the broker server (802) and the application server (801) is subscribed to that authentication topic. A topic is the subject of information that is published in a publish/subscribe message. A message topic provides a mechanism to broadcast event notifications, and endpoints that allow system components to connect to the topic in order to send and receive those messages. A broker is a program that enables applications, systems, and services to communicate with each other and exchange information. The mentioned IoT Message is encrypted, therefore the application server (801) is going to extract the Device ID and other information from the message by a decryption algorithm. Whenever the application server (801) finds a new Device ID, it is going to verify the ID by searching the Inventory list in the server (801). If the ID is already listed in the inventory, the application server (801) will wait for the end-user to put their Device ID written or printed on the disclosed device to the corresponding user interface (804). When both the Device IDs (the one from the inventory and the other from the user input) match, the Device ID is considered authenticated. To give an acknowledgment to the IoT Devices (803) that the Device ID is authenticated, the application server (801) is going to publish a new message to another topic (e.g. Server/SP/Auth) in the broker (802) and the IoT Devices (803) will get this message as their prior subscription to the same topic. As soon as every IoT Device extracts their own Device ID from the message, it is going to start other tasks (e.g. data sending, Over-The-Air update etc.).

FIG. 9 illustrates an embodiment of a Data Sending Architecture. After completion of the authorization and authentication process, the IoT devices (903-1, 903-2, 903-3, . . . 903-N) start the data sending process. Every user authenticated device publishes data to a defined topic (e.g. IoT/SP/Data) in the broker (902) and the application server (901) is going to get that data because of the prior subscription of the same topic. The data is sent in a data-interchange format, such as JavaScript Object Notation (JSON)/String format. The entire data sending process is following an encryption-decryption algorithm. Such IoT devices publish to the same topic of the broker (902).

FIG. 10 illustrates an embodiment of a Firmware Update Architecture. The firmware update process is following the OTA (Over the Air) update process. Users with admin role are provided with a particular user interface (1001) where they can upload the firmware file to the application server (1005). The application server (1005) saves the firmware file to the firmware storage/database (1002). After successful completion of the firmware file saving process, the application server (1005) publishes a message (a notification for the new firmware) to a particular topic in a messaging protocol broker, such as the MQTT (Messaging Queuing Telemetry Transport) broker (1006). On the prior subscription of the same topic in the MQTT broker (1006), the IoT devices (1003) receive the notification message of the new firmware. This notification triggers the HTTPS request for a FOTA (Firmware over the Air) mechanism.

FIGS. 11-16 are schematics of the operational design and interconnection of electric and electronic components in a further embodiment of an IoT device.

Figure 11:
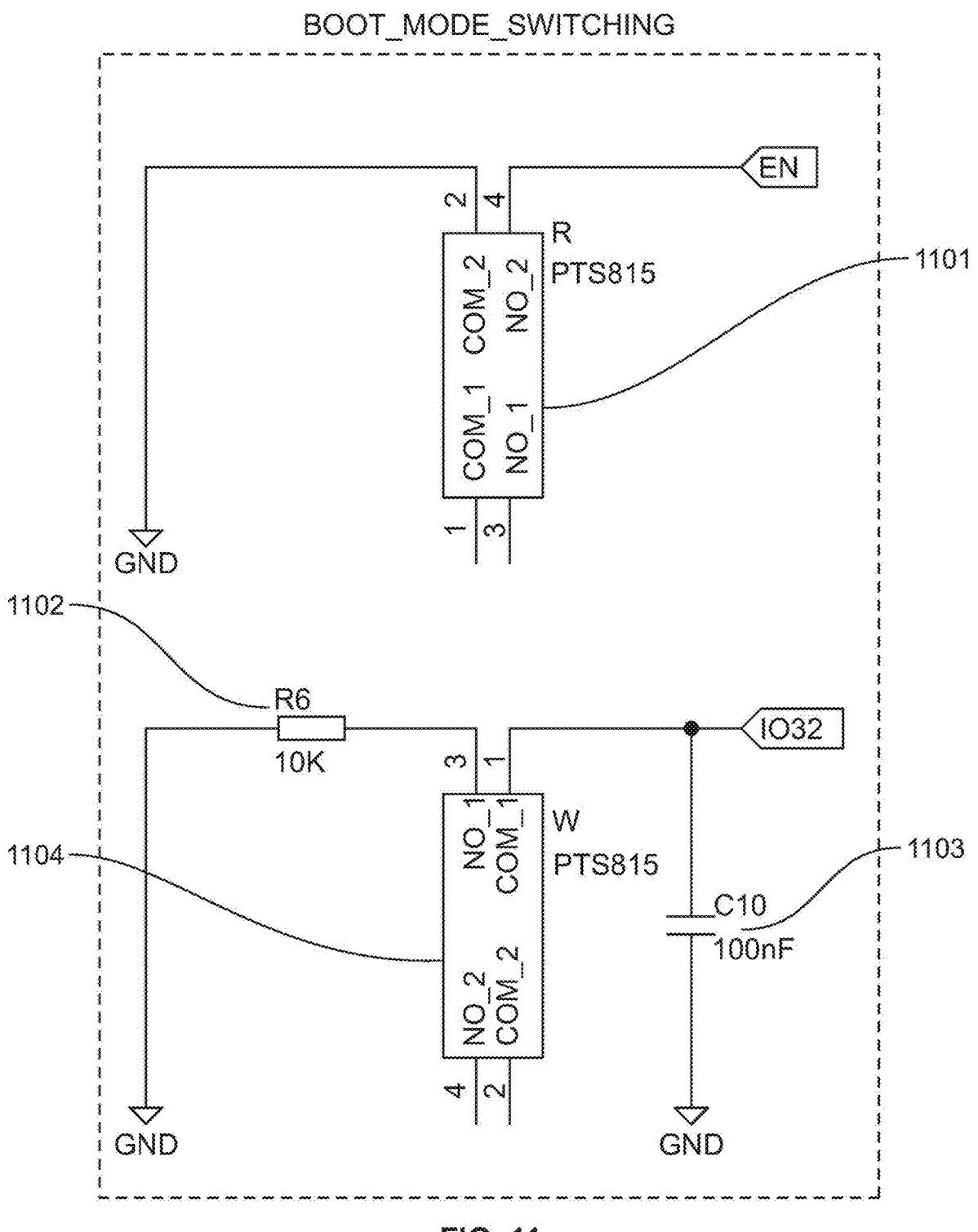
FIG. 11 is a is a first portion of a schematic of an exemplary IoT device showing the interconnection of electric and electronic components.

FIG. 11 shows a Boot Mode Switching schematic in which a single input-single output switch, such as a SPST (Single Pole Single Throw) Tactile switch (1101), has been connected to the Enable (EN) pin of the MCU (microcontroller unit) to add the RESET functionality by pulling down the EN pin (See FIG. 14) to the ground level. The 10K ohm resistor (1102) acts as the pulldown resistor for the tactile switch. The 100 nF ceramic capacitor (1103) filters any switching noise frequency. The SPST tactile switch (1104) connected to the Pin IO34 (See FIG. 14) is used to start Wi-Fi configuration mode or to factory reset the device by pulling down the pin to ground level.

Figure 12:
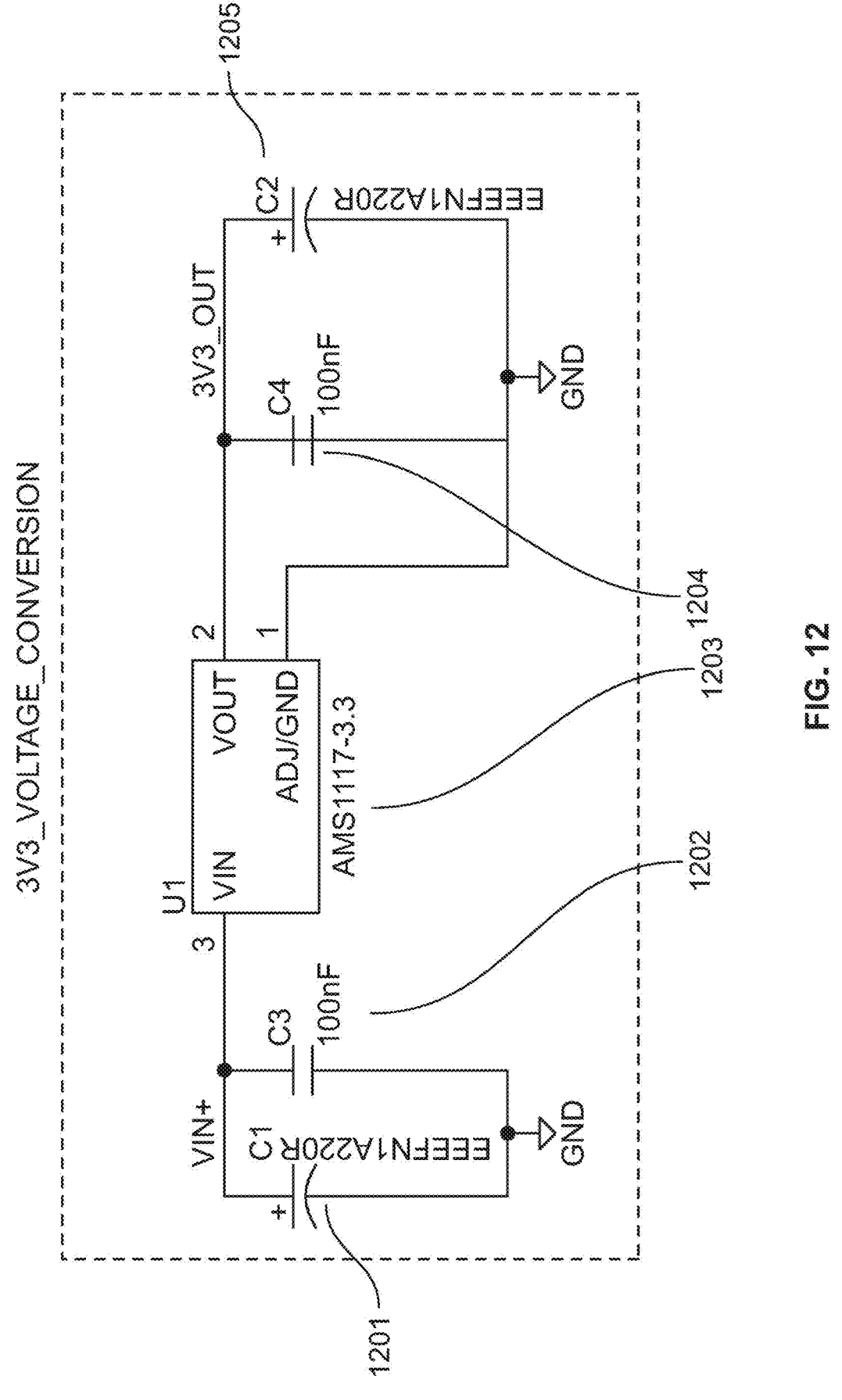
FIG. 12 is a is a second portion of a schematic of an exemplary IoT device showing the interconnection of electric and electronic components.

FIG. 12 shows a 3V3 Voltage Conversion schematic for converting the input voltage to 3V3 volts (3V3_OUT, see FIGS. 13 and 14) to safely power up the MCU. The 22 uF polarized capacitor (1201) is connected to stabilize and minimize the input voltage fluctuations. The 100 nF ceramic capacitor (1202) filters any input noise frequency. The 3V3 fixed linear voltage regulator (1203) is used to regulate up to a max input voltage of 15V to 3.3V. The 100 nF ceramic capacitor (1204) filters any output noise frequency. The 22 uF polarized capacitor (1205) is connected to stabilize and minimize the output voltage fluctuations.

Figure 13:
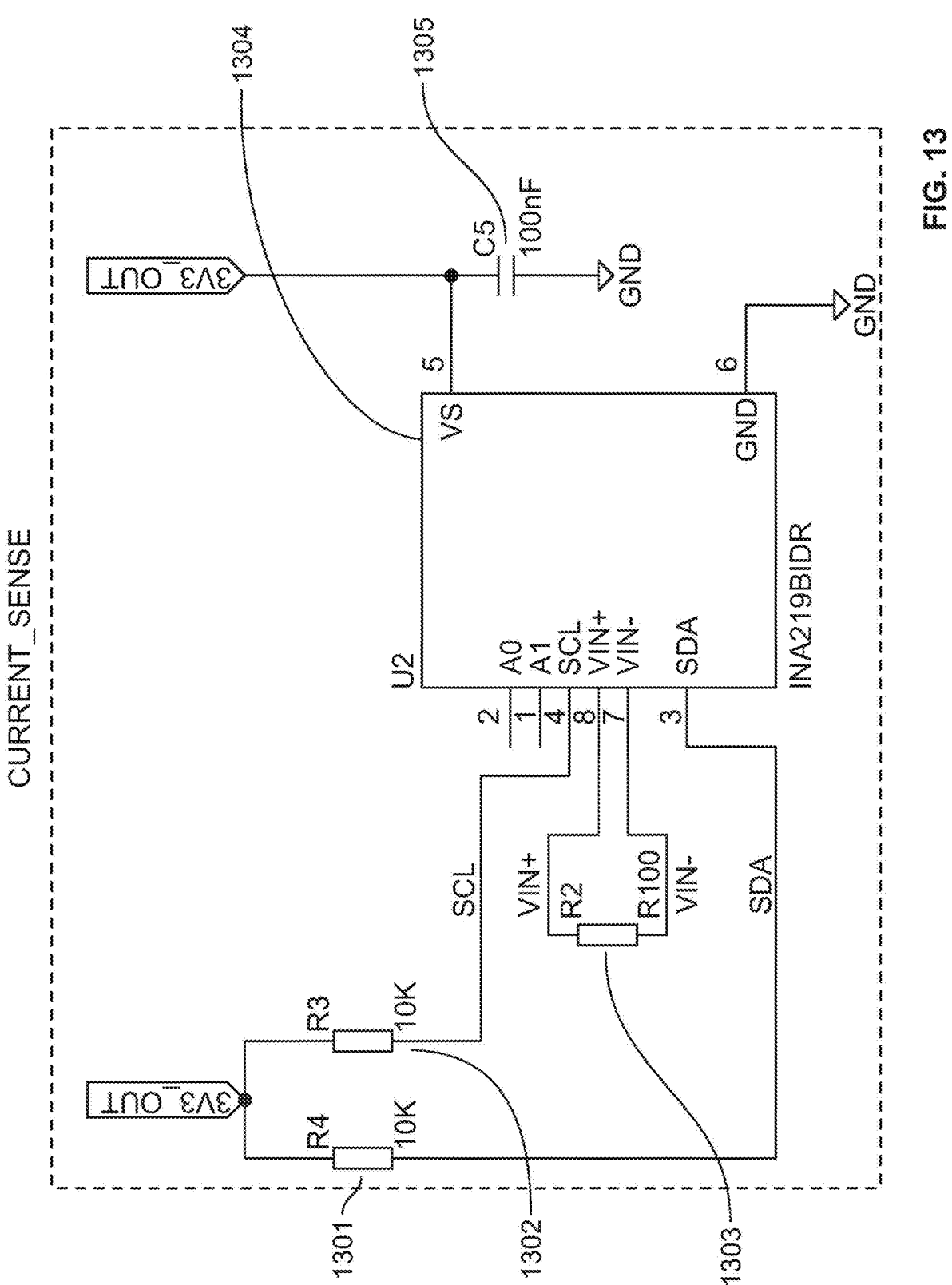
FIG. 13 is a is a third portion of a schematic of an exemplary IoT device showing the interconnection of electric and electronic components.

FIG. 13 shows a Current Sense schematic in which the current consumed by the connected load to the device is calculated. The 10K ohm Pullup resistor (1301) pulls the Serial Data (SDA) pin to 3V3 Voltage level. The 10K ohm pull-up resistor (1302) pulls the Serial Clock (SCL) pin to 3V3 Voltage level. The 0.1 ohm shunt resistor (1303) is connected in series between the input and output, and it is connected to the VIN+ and VIN− pins of the IC to measure the voltage across it. The INA219BIDR (1304) is the current sense IC with built in 12 bit ADC which measures the shunt voltage and calculates the current. The 100 nF ceramic capacitor (1305) is connected across the VS power pin of the IC to eliminate input noise.

Figure 14:
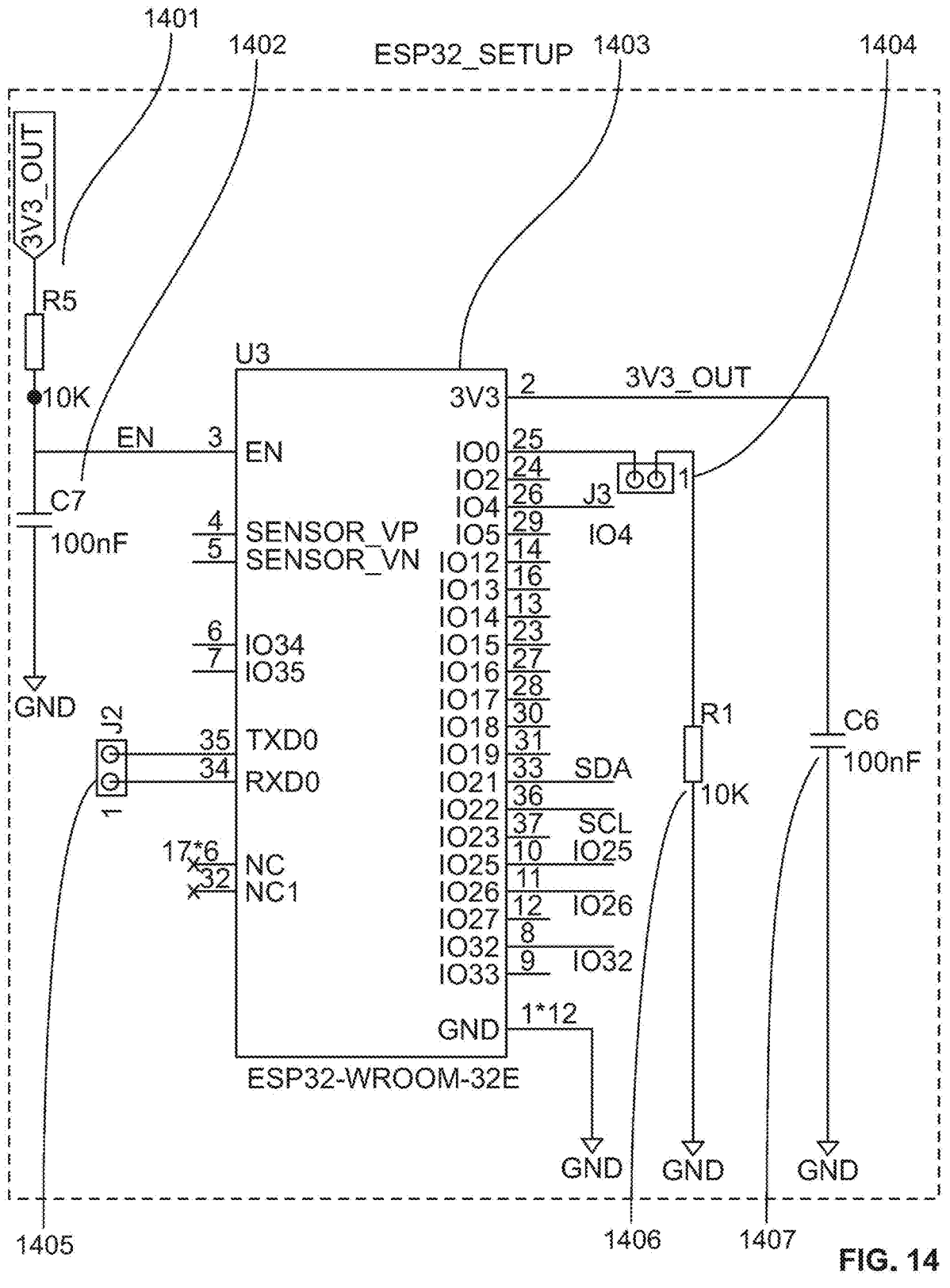
FIG. 14 is a is a fourth portion of a schematic of an exemplary IoT device showing the interconnection of electric and electronic components.

FIG. 14 shows integration of an MCU with Wi-Fi, Bluetooth (BT), and Bluetooth Low Energy (BLE) as part of an IoT device. This example is an ESP32 SETUP schematic in which a Wi-Fi+BT+BLE MCU module, such as ESP32-Wroom-32E (1403), works as the main processing unit of the whole system. The 10K ohm resistor (1401) is connected to the Enable (EN) pin of the MCU to pull it up to the 3V3 Voltage level. The 100 nF ceramic capacitor (1402) is connected to reduce any switching noise. ESP32-Wroom-32E (1403), the Wi-Fi and BLE-enabled powerful MCU works as the primary processing unit and connects all the required ICs in the board, and includes the system firmware. The jumper arrangement (1404) pulls down the 100 pin to ground level for boot mode. Pins (1405) are connected to access the Serial Data Transfer (TXD0) and Data Receive (RXD0) pins. The 10K ohm pull-down resistor (1406) is connected to pull the 100 pin down as per the jumper arrangement. The 100 nF ceramic capacitor (1407) is connected across the Power pin (3V3) and ground to eliminate input noise.

Figure 15:
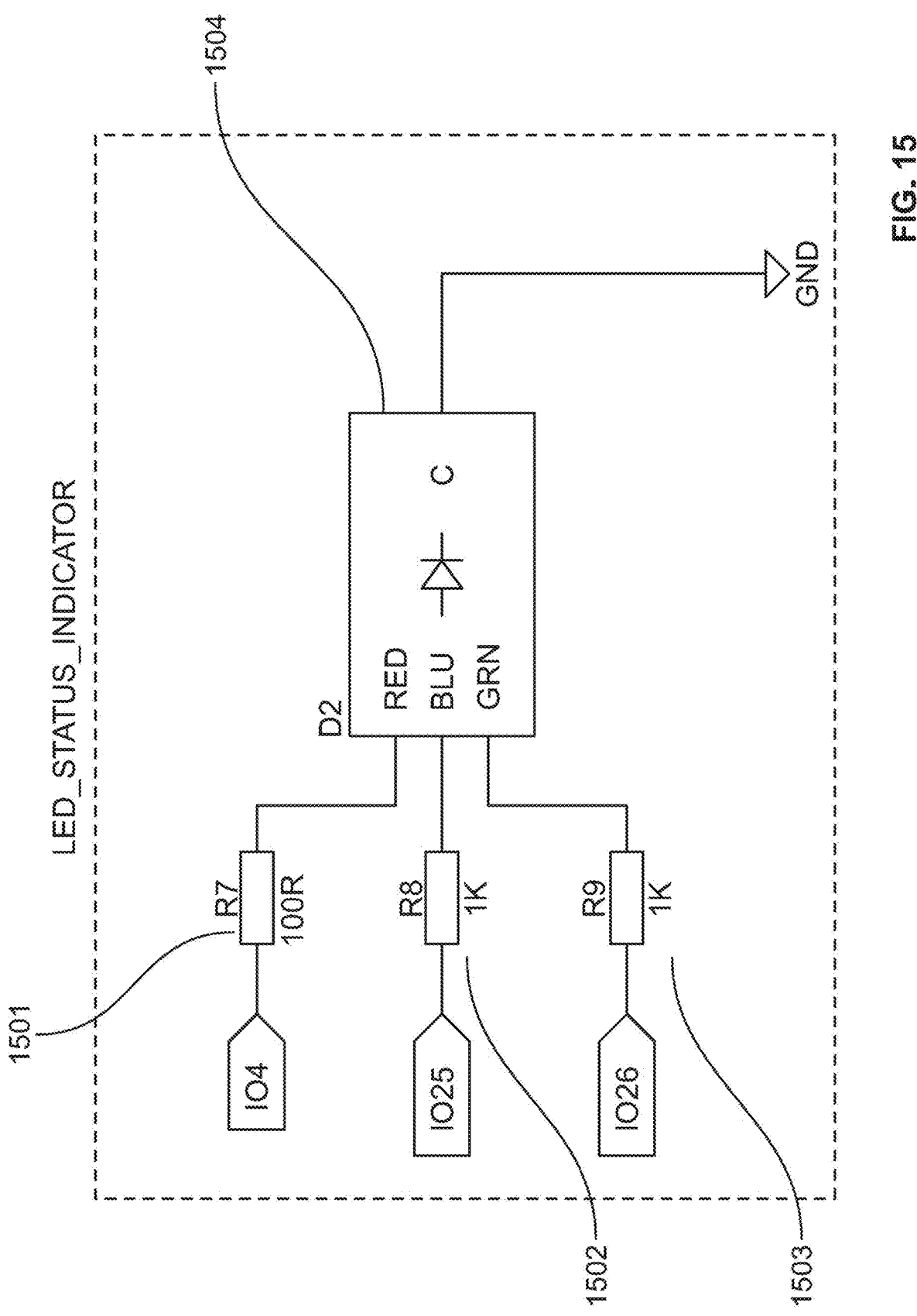
FIG. 15 is a is a fifth portion of a schematic of an exemplary IoT device showing the interconnection of electric and electronic components.

FIG. 15 shows a LED Status Indicator schematic in which a common cathode RGB LED connected to the MCU indicates the status of the program. The 100 ohm current limiting resistor (1501) is connected to the Red LED pin (RED) and the IO4 Pin of the MCU (see FIG. 14). The 1K ohm current limiting resistor (1502) is connected to the Blue LED pin (BLU) and the IO25 Pin of the MCU (see FIG. 14). The 1K ohm current limiting resistor (1503) is connected to the Green LED pin (GRN) and the IO4 Pin of the MCU (see FIG. 14).

Figure 16:
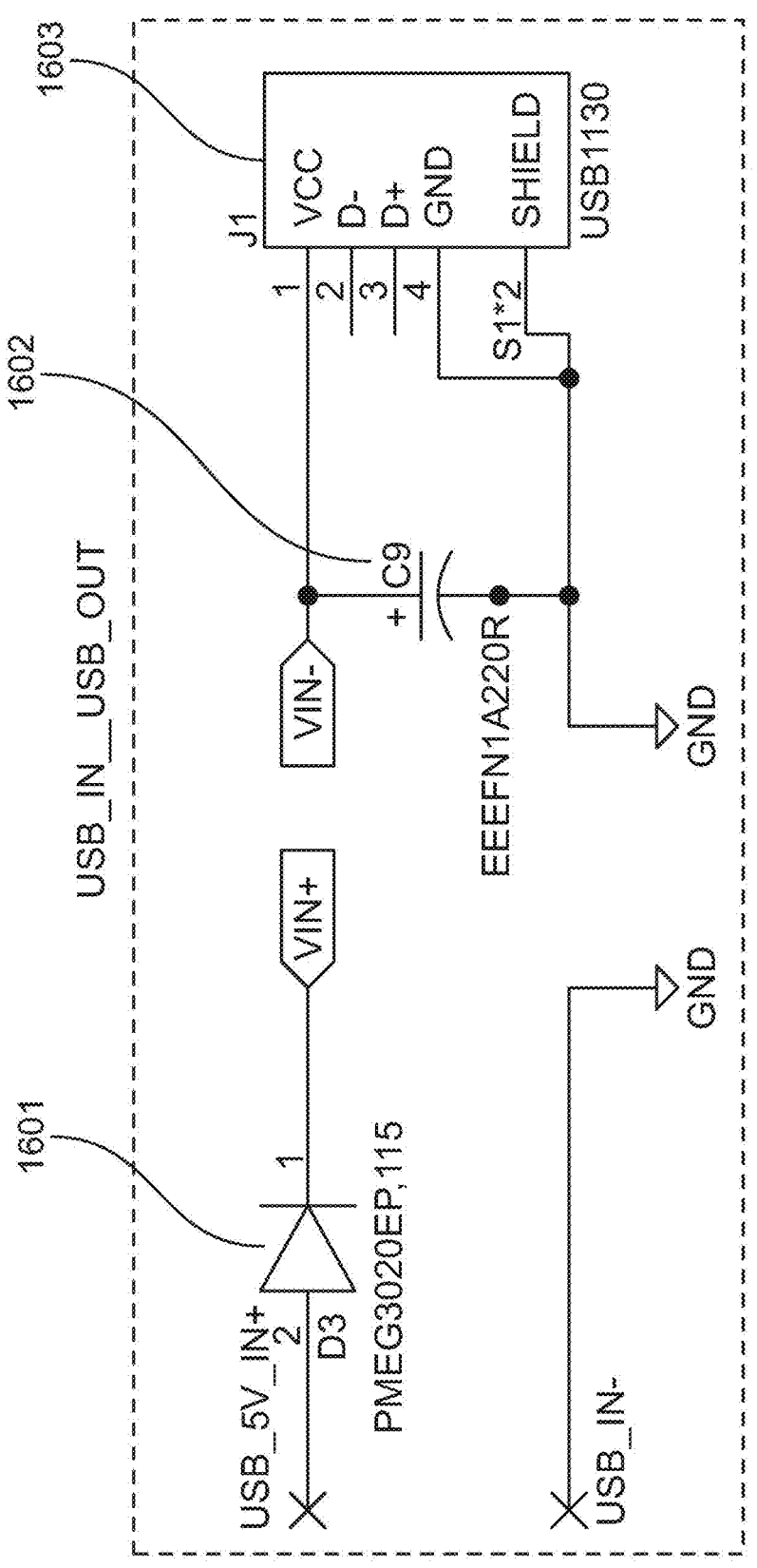
FIG. 16 is a is a sixth portion of a schematic of an exemplary IoT device showing the interconnection of electric and electronic components.

FIG. 16 shows a USB In USB Out schematic including the input and output arrangement, where the power source and the load are connected (see FIG. 13). The semiconductor diode, such as a PMEG3020 schottky diode (1601) is connected in series across the input pin to protect the circuit from reverse polarity with significantly low voltage drop. The 22 uF polarized capacitor (1602) is connected to reduce voltage ripple and stabilize the output voltage.

The IoT device of the present invention describes and achieves specific objectives for assuring the monitored device can function correctly, including, for example, power use and availability of communications channels used by the device, methods for immediately reporting any abnormal conditions, including notifying appropriate users of the situation. Thus, there is very specific data collected and communicated, simplifying the design and improving security.

The IoT device can provide rapid notification, within a few seconds, of any deviation of the device from specific normal power use ranges, quite different from infrequent, broad energy use monitoring. In addition, the IoT device monitors the communications channels needed by the monitored device to assure it can communicate its results. The IoT device also immediately notifies of any abnormal conditions. The invention also provides for the acquisition and transmission of protected health information across multiple networks and security domains.

In order to determine that a device is using power, the IoT device is either told the specific power usage characteristics of the monitored device by the Monitoring System, or observes and characterizes the power levels of the single device plugged in, to determine if the device is functioning properly.

In contrast to prior art smart plugs, which could be programmed to shut off devices to conserve energy, the IoT device is designed to keep devices functioning, both power and communications, and immediately signals when any problem occurs. In the past, one of the main motives for using a smart plug was to reduce energy loss while electrical appliances are on and this is where the feature of occupancy detection comes into existence. Prior art devices turned off appliances when not needed. This Standby Power Killer mode would turn the device off when not needed to eliminate power used in standby mode. However, the IoT device is designed to keep devices functioning and notify when they are not, because the IoT device does not turn devices on or off, but it sends alerts when a device is not functioning so that a user is made aware that the device is not functioning as it should be.

Thermal and Overload Protections against voltage surges and spikes, and overheating of the device, are critical. Some IoT systems can detect that a single device (e.g., a smart thermostat) have gone offline. The IoT device of the invention uniquely (a) allows anything connected to it to be monitored, (b) allows multiple devices to be connected, and (c) allows anything connected to it to be actively monitored by the cloud server. The IoT device detects abnormal power use by the device based on specified power levels for the particular monitored device, not simply generic overloads. And the IoT device immediately reports any abnormal conditions. The IoT device is either told the specific power levels or characterizes the power levels of normal operation of the single device plugged in to determine if the device is functioning properly, rather than trying to guess the characteristics of the device by being told what room it is in. Nominal operating voltage; anything outside of that designated range is detected and sends an alert.

Further Design and Implementation of the IoT Device and IMD

The IoT device is designed to monitor the health of communications used by the devices being monitored, for example, Wi-Fi, Internet, Cellular Internet, and SMS. IoT devices can use these media very efficiently because the periodic messages it sends are very short, and these messages can fit into even busy systems. Other smart plugs do not have, e.g., cloud monitoring of the device. Here, the IoT device is coupled in a closed loop with cloud monitoring. The IoT device can also use multiple communications media and path to assure ability to communicate status. Congestion can be further reduced by having the monitoring system use a protocol, such as polling, to manage congestion. With a network of IoT devices the short range methods described here can be used, or other methods, such as powerline communications are available. If these local methods are not available for any reason, the channels being monitored can be used for communications as well.

Cybersecurity is a major challenge for internet-connected devices. Deploying devices that may be in service for many years without modification makes them open to the continuing advance of threat technologies. The wide range of communications needs for smart plugs means they need flexible communications systems. Because smart plugs have limited computing resources, they are restricted in the security measures they can employ. The IoT device of the invention is designed for very specific objectives with very limited messages, going only to the Monitoring System. Thus, they can use a very secure communications protocol because the type of communication is so limited. Any communications for other purposes, such as a user entering power levels for a device, is directed through the monitoring system, which can use more sophisticated protection and can be continually updated for new threats. Similarly, even for a local network of IoT devices, the communications are very simple, just forwarding messages to and receiving messages from the Monitoring System, so they can be secure over a long deployment period. The IoT device of the invention also monitors physical security of the IoT physical asset being monitored, and alerts the system if the physical device monitoring the patient/individual is stolen or removed from its physical location.

The disclosed system can monitor the functional status of a remote IoT biometric data acquisition device such as a blood glucose monitor, blood pressure cuff, temperature monitor, heart rate monitor, health monitoring watch, sleep mat, pulse oximeter, normally-open or normally-closed relay, weight scale, camera, and other types of medical monitoring devices, such as a vital signs monitor that can identify patient position, breathing, heart rate, and relay information to clinicians. Prior art monitoring systems, such as the Oxehealth monitoring system, can't carry information across systems and thus have no redundant monitoring. Oxehealth devices can send messages but have no way of knowing if messages sent are received. Other prior art monitoring systems, such as Withings, have a receipt-only mode, and so these systems can't distinguish between whether the absence of reporting from the device being monitored means the device is offline or if there is no data to report. With these prior art devices and systems, if a device doesn't send data, the system can't tell whether there has been a disconnection or other issue. These devices only act if there is data, and do not act if there is not data. For example, if a prior art sleep mat for a person with fall risk was unplugged, or lost connection, the person being monitored could fall or get out of bed and no one would be notified. The IoT devices of the present invention solve this problem by providing notifications when the sleep mat is not functioning or communicating normally, so that the problem can be corrected to ensure that a user will be notified when an event does occur, such as a fall from the bed.

The invention includes a system for monitoring the connectivity between various IoT devices and cloud or on-premise based computing systems that can capture and store the data streams from these devices in proprietary (or other) databases which may or may not be compliant with HIPAA-type regulations. This occurs by building in multiple layers of monitoring and reporting. For example, the device doing the monitoring is itself being monitored and the cloud itself is being monitored.

The invention includes a system for provisioning IoT devices, from one or more manufacturers, to associate them with individuals and maintain this information in a format that is readily and rapidly accessible so that when a series of contingencies are met that indicate that the user of a device is in a state that requires medical attention, that information can be communicated to relevant people or institutions (e.g., a health care professional, medical office, and the like). An identifying number or code is assigned to a patient or collection of devices serving a patient. This can be tied into caseloads-type security as discussed above.

The invention includes a system for provisioning IoT devices, from one or more manufacturers, to associate them with individual users and maintain this information in a format that is readily and rapidly accessible so that when a series of contingencies are met that indicate that the device is in a state that requires medical attention, that information can be communicated to relevant people or institutions (e.g., an operations support staff person, or tech support department). An identifying number or code is associated with specific users based on patient assignments.

The invention includes a system that, when combined with the above technologies, provides real-time alerts of changes a biological individual's (e.g., person, animal) condition such as when an incontinence mat detects moisture, an ECG monitoring device detects an abnormal heart rate or rhythm.

The invention includes a system that, when combined with the above technologies, provides real-time alerts of changes in device condition such as when a device is unexpectedly powered off.

The invention includes a system that, when combined with the above technologies, provides real-time alerts of changes in the status of the network connecting the device with the computer system(s) maintaining the databases via text message, email, phone call, or other.

The invention includes a system that, when combined with the above technologies, provides a non-real time logging of pre-specified events (e.g., a patient's body fat mass exceeding a threshold value) via email, or summary on a web page(s), or a display on a screen. When some machines, like a heart monitor or sleep mat, goes offline, a user will want to know in real time. For other machine measurements, such as blood pressure readings, measurements may not be needed in real time but such measurements can be collected and stored, along with device status (e.g., storing information that a blood pressure device did not take a prescribed blood pressure reading but also storing that the blood pressure device was functioning).

The invention includes a system that can be updated over a network to incorporate new functionality, fix software and firmware bugs, and optimize existing functionality. This is because changes to the functionality of the socket can be downloaded to the socket directly.

Embodiments of the invention include:

1. A system for monitoring the functional status of a remote Internet of Things (IoT) biometric data acquisition device such as an incontinence monitor, blood glucose monitor, heart rate monitor, blood pressure cuff, temperature monitor, sports watch, sleep mat, pulse oximeter, normally-open or normally-closed relay, weight scale, camera, or other medical monitoring device.

2. A system for monitoring the connectivity between various IoT devices and cloud or on-premise based computing systems that capture and store the data streams from these devices in proprietary (or other) databases which may or may not be compliant with HIPAA-type regulations.

3. A system for provisioning IoT devices, from one or more manufacturers, to associate them with individual users and maintain this information in a format that is readily and rapidly accessible so that when a series of contingencies are met that indicate that the user of a device is in a state that requires medical attention, that information can be communicated to relevant people or institutions (such as a health care professional, medical office, or others).

4. A system for provisioning IoT devices, from one or more manufacturers, to associate them with individual users and maintain this information in a format that is readily and rapidly accessible so that when a series of contingencies are met that indicate that the device is in a state that requires medical attention, that information can be communicated to relevant people or institutions (e.g., an operations support staff person, or tech support department).

5. A system that, when combined with the above technologies, provides real-time alerts of changes a biological individual's (e.g., person, animal) condition such as when an incontinence mat detects moisture, an ECG monitoring device detects an abnormal heart rate or rhythm.

6. A system that, when combined with the above technologies, provides real-time alerts of changes in device condition such as when a device is unexpectedly powered off.

7. A system that provides real-time alerts of changes in the status of the network connecting the device with the computer system(s) maintaining the databases via text message, email, phone call, or other.

8. A system that provides a non-real time logging of pre-specified events (e.g., a patient's body fat mass exceeding a threshold value) via email, or summary on a web page(s), or a display on a screen.

9. A system that can be updated over a network to incorporate new functionality, fix software and firmware bugs, and optimize existing functionality.

The invention claimed is:

1. A device for monitoring the status of a medical device, comprising:
a processor having a memory,

16 a wireless telecommunication channel coupled to said processor,
a socket for connecting to the medical device, and
a current measuring device coupled to said socket and said processor,
wherein said processor is configured to:
receive a current sensing signal from said current measuring device, wherein said current sensing signal is a medical device current measurement calculated from a voltage measured by said current measuring device,
determine a status of the attached medical device based on said current sensing signal and a deviation from a specified power level for the medical device, and
transmit a periodic signal based on said status for transmission on said wireless telecommunication channel.

2. A device according to claim 1, wherein:
said signal is a status signal indicating whether the medical device is drawing power.

3. A device according to claim 1, further comprising:
an indicator for showing that said wireless communication channel is connected to a communications network.

4. A device according to claim 1, further comprising:
an indicator for showing that said monitoring device is connected to power.

5. A device according to claim 1, wherein:
said socket is one or more of a USB connector and a stereo jack socket.

6. A device according to claim 1, wherein:
said signal is a status signal indicating whether the medical device is deviating from normal power consumption.

7. A device according to claim 1, wherein:
the medical device is a biometric data acquisition device.

8. A device according to claim 1, wherein:
said wireless communication channel is adapted to connect to a communications network.

9. A device according to claim 1, wherein:
said wireless communication channel is one of Wi-Fi, Bluetooth, Bluetooth Low Energy (BLE), and cellular internet.

10. A method of securely operating a device for a user to monitor the status of an medical device for providing care to an individual under care, comprising:
providing a monitoring device having a processor, and a memory, storing, in said memory of said monitoring device, the user's access information,
providing an IoT device having
a processor having a memory,
a wireless telecommunication channel coupled to said processor,
a socket for connecting to the attached medical device, and
a current measuring device coupled to said socket and said processor,
connecting the medical device to the monitoring device,
detecting, by the monitoring device, the connection to the medical device, calculating, by the monitoring device's current measuring device, a medical device current measurement calculated from a voltage measured by said current measuring device,
determining, by said processor, a status of the medical device based on said current measurement and a deviation from a specified power level for the medical device,

sending, by the monitoring device's wireless communication channel, a status signal to the monitoring device, receiving, by said monitoring device, said status signal, determining, by said monitoring device, whether said status signal has been disrupted, determining, by said monitoring device, whether the user is authorized to access information pertaining to the individual, wherein the determination is based on said user's access information, providing an alert to the authorized user that the status signal has been disrupted.

11. A method according to claim 10, wherein:

said information is personal health information.

12. A method according to claim 10, wherein:

said determining of user access authorization is HIPAA-compliant.

13. A method according to claim 10, wherein:

the medical device is a biometric data acquisition device.

14. A method according to claim 13, wherein:

said biometric data acquisition device is one of an incontinence monitor, a blood glucose monitor, a heart rate monitor, a blood pressure cuff, a temperature monitor, a sports watch, a sleep mat, a pulse oximeter, a normally-open or normally-closed relay, a weight scale, and a camera.

15. A method according to claim 10, wherein:

the medical device is a life support device.

16. A method according to claim 10, wherein:

the medical device is one of a refrigerator and an air conditioner.

17. A method according to claim 10, further comprising:

storing the status signal in a database of said monitoring device.

18. A method according to claim 17, wherein:

said storing of the status signal in said database is HIPAA-compliant.

19. A method of securely operating a device for monitoring the status of a medical device, comprising:

providing a status monitoring device having a processor having a memory, a wireless telecommunication channel coupled to said processor, a socket for connecting to a medical device, and

a current measuring device coupled to said socket and said processor, connecting the medical device to the status monitoring device, detecting, by the status monitoring device, the connection to the medical device, calculating, by the status monitoring device's current measuring device, a medical device current measurement calculated from a voltage measured by said current measuring device, determining, by said processor, a status of the medical device based on said current measurement and a deviation from a specified power level for the medical device, providing an application server having a memory, providing a broker server, sending to a first authentication topic in the broker server, via the wireless communication channel of the status monitoring device, a message containing the status monitoring device's identity, subscribing, by the application server, to said authentication topic, verifying, by the application server, said device identity is stored within said memory of said application server, sending, by said application server, a message to a second topic in said broker server, sending, to said status monitoring device via said wireless communication channel, said message, sending, by said status monitoring device via said wireless communication channel to said application server, medical device status data.

20. A method according to claim 19, further comprising:

subscribing, by said status monitoring device, to a third topic on said broker server, providing a user interface, uploading, via said user interface, a firmware file to said application server, saving, in said memory of said application server, said firmware file, publishing, by said application server, a firmware notification message to said third topic on said broker server, receiving, by said status monitoring device subscribed to said third topic, said firmware notification message.

* * * * *